United States Patent
Bell et al.

[11] Patent Number: 5,878,292
[45] Date of Patent: Mar. 2, 1999

[54] IMAGE-AUDIO PRINT, METHOD OF MAKING AND PLAYER FOR USING

[75] Inventors: Cynthia S. Bell, Webster; Stephen J. Rowan, Spencerport; Richard S. Keirsbilck; James Gresko, both of Rochester; Helen Swede, Williamsville; David L. Patton, Webster; Daniel M. Pagano, Honeoyo Falls, all of N.Y.

[73] Assignee: Eastman Kodak Company, Rochester, N.Y.

[21] Appl. No.: 796,323

[22] Filed: Feb. 7, 1997

Related U.S. Application Data

[60] Provisional application No. 60/025,163 Aug. 19, 1998.

[51] Int. Cl.$^6$ .................................................. G03B 17/24
[52] U.S. Cl. ......................... 396/312; 40/124.3; 40/455; 434/308; 273/237
[58] Field of Search ............................... 396/312; 40/455, 40/124.3; 434/308, 309, 311; 273/237

[56] References Cited

U.S. PATENT DOCUMENTS

| | | | |
|---|---|---|---|
| 4,400,457 | 8/1983 | Johnson | 430/140 |
| 4,664,634 | 5/1987 | Cuter et al. | 343/311 |
| 4,791,741 | 12/1988 | Kondo | 40/455 |
| 4,905,029 | 2/1990 | Kelley | 354/76 |
| 5,045,327 | 9/1991 | Tarlow et al. | 40/124.3 |
| 5,063,698 | 11/1991 | Johnson et al. | 40/455 |
| 5,128,700 | 7/1992 | Inoue et al. | 354/86 |
| 5,276,472 | 1/1994 | Bell et al. | 354/76 |
| 5,313,235 | 5/1994 | Inoue et al. | 354/76 |
| 5,359,374 | 10/1994 | Schwartz | 354/76 |
| 5,363,157 | 11/1994 | Cocca | 354/76 |
| 5,365,686 | 11/1994 | Scott | 40/455 |
| 5,433,610 | 7/1995 | Godfrey et al. | 434/308 |
| 5,480,156 | 1/1996 | Doederlein et al. | 273/237 |
| 5,499,465 | 3/1996 | Manico | 40/455 |
| 5,520,544 | 5/1996 | Manico | 40/455 |
| 5,521,663 | 5/1996 | Norris, III | 354/106 |
| 5,548,272 | 8/1996 | Clark | 40/455 |
| 5,644,557 | 7/1997 | Akamine et al. | 369/14 |
| 5,671,555 | 9/1997 | Fernandes | 273/237 |

FOREIGN PATENT DOCUMENTS

| | | |
|---|---|---|
| 2 697 938 -A1 | 10/1992 | France . |
| WO 92/20065 | 11/1992 | WIPO . |
| WO 94/15253 | 7/1994 | WIPO . |
| WO 94/28529 | 12/1994 | WIPO . |
| WO 95/14958 | 6/1995 | WIPO . |

*Primary Examiner*—Russell Adams
*Attorney, Agent, or Firm*—Francis H. Boss, Jr.

[57] ABSTRACT

An image-audio print has either a single image or a set of images on a first side and an accessible audio data storage means preferably on its backside. The accessible audio data storage means contains an audio data segment associated with the image on single image prints and a set of audio data segments, one for each image on multi-image prints, for example, index prints. A player receives and locates the image-audio print with the accessible audio data storage means accurately positioned in electrical contact with the player apparatus. The player apparatus can play an audio data segment associated with the print from a single image print or by appropriate interaction with the user who selects a audio data segment associated with the selected image on multi-image prints. Preferably, a touchscreen is used to select the image for which the audio is to be played. The player also can record audio into the accessible audio data storage means and copy audio from one print to another. The prints can be manufactured by using a backing substrate into which a recess is created for the audio data storage means and which is, preferably, adhesively attached to the back of ordinary paper print substrate. The backing paper provides not only the recess for the audio data storage means, but also adds heft to the print. Alternatively, the audio data storage means can be formed integrally with a full print-sized back of the print and affixed to the back by hand or automatically. Further, the print can be formed by taking a full print-sized backing with an integral audio data storage means and applying an image to the frontside of it, by inkjet printing, thermal dye transfer, electrophotographic or other hard copy imaging means.

38 Claims, 32 Drawing Sheets

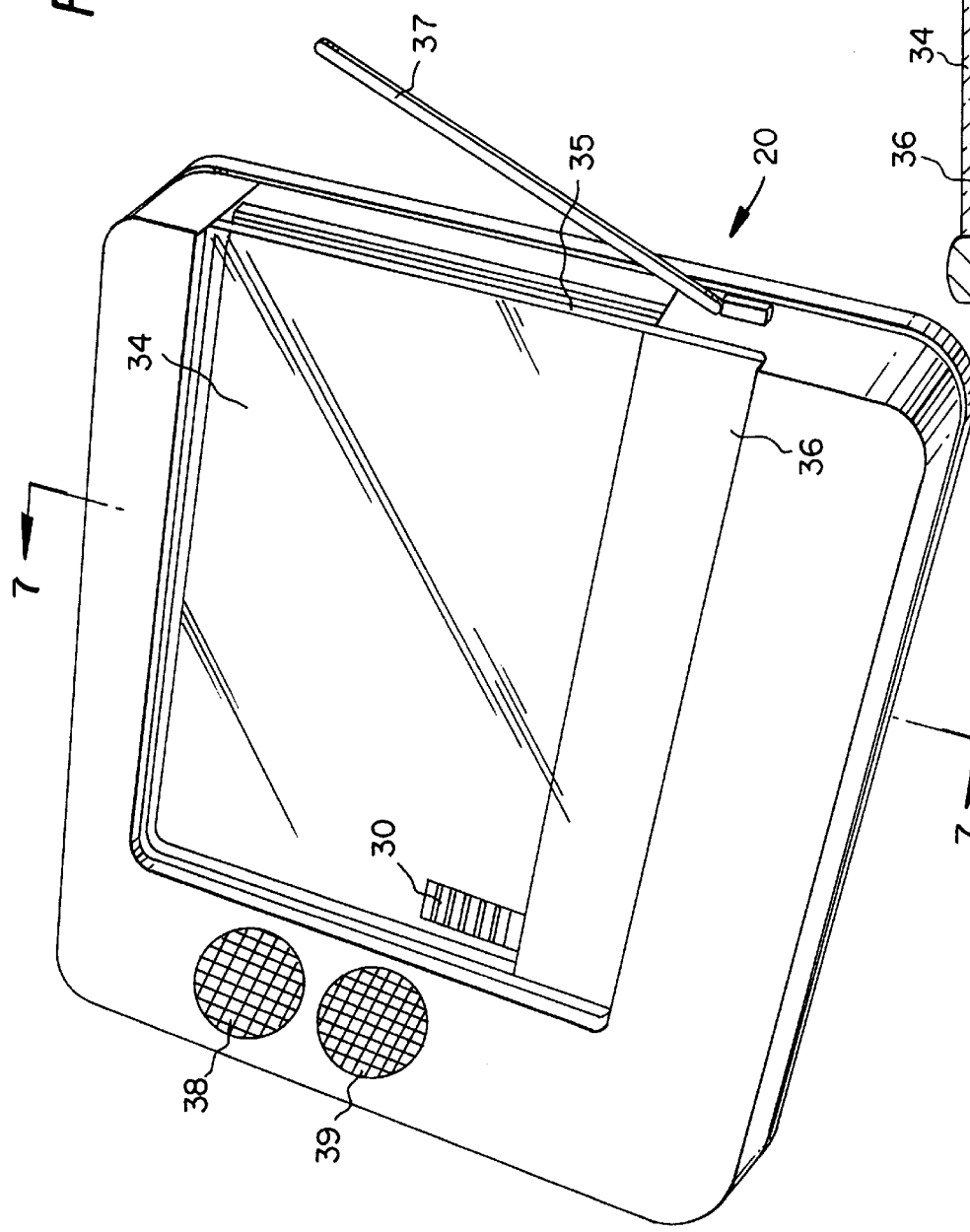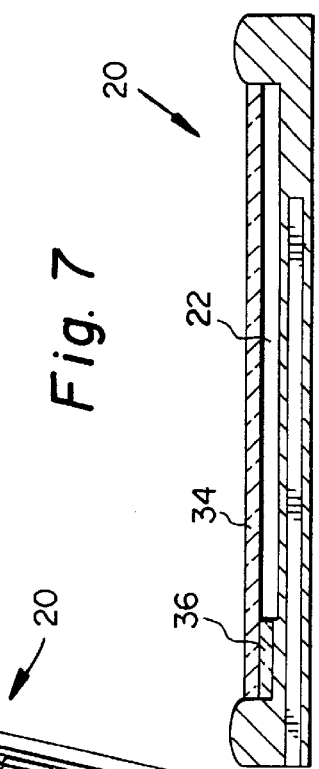
Fig. 6
Fig. 7

Fig. 38

Fig.48　READING AUDIO DATA OF PICTURE 22 [STOP]

Fig.49　PLEASE INSERT THE NEXT PRINT

Fig.50　WRITING AUDIO DATA FOR PICTURE 22

Fig.51　RECORD OVER EXISTING AUDIO ? [YES] [NO]

Fig.52　TOUCH IMAGE = AUDIO SOURCE [STOP]

Fig.53　IMAGE SOURCE = PICTURE 18

Fig.54　TOUCH IMAGE = AUDIO DEST'N [STOP]

Fig.55　IMAGE DEST'N = PICTURE 17

Fig.56　SOURCE = 18 DEST'N = 17 [RECORD] [RESELECT]

Fig.57　[STOP] COPY RECORDING

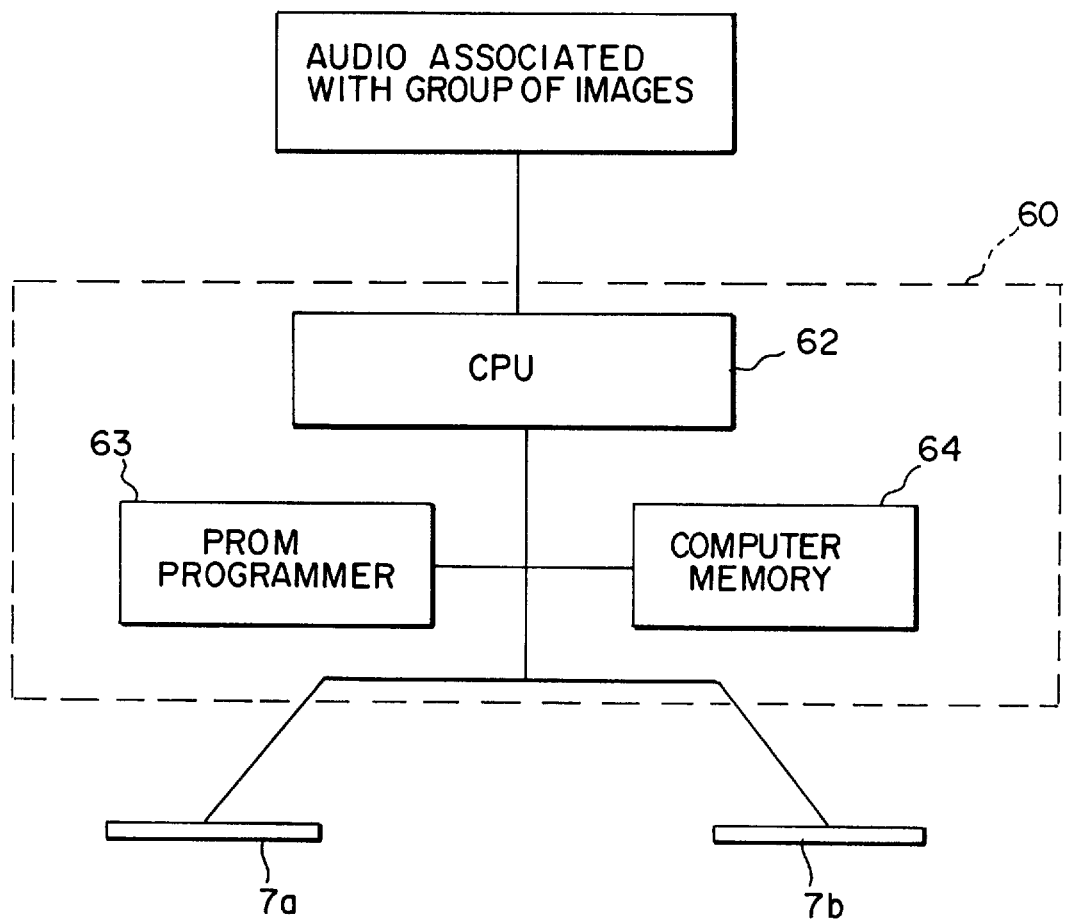

IMAGE-AUDIO PRINT, METHOD OF MAKING AND PLAYER FOR USING

This invention relates to an image print having an audio data storage means. It also relates to a method of making such a print and to a player for facilitating viewing and listening to the print.

U.S. Pat. Nos. 5,363,158 to Stoneham, issued Nov. 8, 1994; U.S. Pat. No. 5,389,989 to Hawkins et al, issued Feb. 14, 1995; U.S. Pat. No. 5,276,472 to Bell et al, issued Jan. 4, 1994; and U.S. Pat. No. 5,363,157 to Cocca, issued Nov. 8, 1994, are representative of a number of references which show cameras capable of recording both still pictures and audio. Typically, a microphone in the camera is used to record a message or other audio data at the time of picture taking in a storage mechanism permanently located in the camera. The recorded data is then either magnetically or optically rerecorded onto the film.

In U.S. Pat. No. 5,276,472, referred to above, the photofinisher reads the audio data from the film and converts it into a suitable encodement format such as a bar code or binary coded blister marks which are impressed on the photoprint itself for subsequent playback. The encodement can be a series of blisters on the print in the front margin or its backside. Playback is accomplished by scanning the encodement across a reader which converts the encodement into audio data and stores it into a memory which can then be accessed by pushing suitable buttons on the reader itself.

U.S. Pat. No. 5,365,686 to Scott, issued Nov. 22, 1994, shows a sleeve for a photograph, which sleeve includes an IC memory into which audio data can be recorded and from which it can be retrieved. The sleeve can be "plugged in" to a player by vertical movement of an end of the sleeve into an electrical connector in the player.

U.S. Pat. No. 5,313,235 to Inoue et al, issued May 17, 1994, shows a player for receiving a print in a slot. The print has a code on it which is readable by the player as the print is inserted. A separate audio data storage medium is also insertable into a different slot in the player. The player can recognize the code and play audio associated with that particular photograph from the audio data storage medium. In another embodiment, the audio data from the camera is transferred to a magnetic tape which is adhered to the front of the photographic print. A magnetic head in the player reads the magnetic tape to provide the audio with the photograph. See also, U.S. Pat. No. 5,128,700 to Inoue et al, issued Jul. 7, 1992.

U.S. Pat. No. 4,905,029 to Kelley, issued Feb. 27, 1990, shows a single sheet photographic recording medium having a magnetic acoustic medium integral with its frontside. The camera provides both an exposure of the photographic medium and recording on the acoustic medium. A player can receive the print in a position where it can be viewed while the magnetic acoustic data is being played. This reference suggests that, although not currently practical, the magnetic acoustic recording medium may be replaced with an electronic chip attached to or embedded in the paper laminates of a photograph. The chip would have one or more miniature wire coils extending from it which would communicate power, input of acoustic data and output of acoustic data by magnetic induction.

PCT International Publication WO94/15253, published Jul. 7, 1994 to Tsai, also suggests a still picture-audio system in which a magnetic or optical audio "data strip" is shown on the front of a slide or print. It is also suggested that the strip could be on the back surface of a print. It is also suggested that the storage media could also someday be an optical WORM or semiconductor memory, such as a PROM or ROM. See also, PCT International Publication W095/14958, published Jun. 1, 1995.

U.S. Pat. No. 5,521,663, granted to Norris on May 28, 1996, discloses a system for optically recording audio data on film. A player can access audio data from a group of images and record it for selective playback by touching a portion of a sleeve containing the image.

U.S. patent application Ser. No. 08/237,077, filed May 3, 1994, to Manico et al, discloses an apparatus for storing and displaying prints or other images which includes a module which can play audio associated with an image from a physically separate audio data storage medium when that image is displayed. In some embodiments, the prints are coded with information allowing automatic retrieval of the audio in response to accessing the coded information.

U.S. Pat. No. 5,433,610 to Godfrey et al, issued Jul. 18, 1995, shows an educational device for children in which a number of discrete photos are arranged in columns and rows with each photo connected to a discrete recorded message such that, upon a photo being pressed, the message is played. See also, U.S. Pat. No. 4,664,634 to Cutler et al.

French Patent No. 2,697,938 to Vocal Technologies, published May 13, 1994, is typical of a number of references which show postcards and other similar devices which combine a photograph, audio and a speaker for playing the audio. See also, U.S. Pat. No. 5,359,374 to Schwartz, issued Oct. 25, 1994.

In association with modern photographic systems, many photofinishers furnish what is known as an "index print" with the prints from a single roll of film. The index print is a single print with small images duplicating each of the prints on a roll of film (or other group of original images) and arranged in columns and rows. PCT International Publication No. 92/20065, published 12 Nov. 1992, shows apparatus for receiving and viewing an index print. In this reference the index print is inserted under a touchscreen which allows individual pictures in the index print to be accessed by touching for purposes of showing that particular image electronically.

It is clear that the customer has a desire for sound (audio) associated with images. The audio can be a message from the photographer, a recording of things happening at the time the picture was taken, or suitable music or other audio effects associated with the scene being photographed. Many of the approaches in the above references satisfy this desire with separate audio data storage devices which must be separately plugged into a player and are separated from the print in storage. Others involve storage mediums on the print itself which reduce the image portion of the print or make the print body less compact. Still others involve storage media which degrade with use or time.

SUMMARY OF THE INVENTION

It is an object of the invention to improve the reliability and convenience associated with the combination of audio and images.

According to one aspect of the invention, this and other objects are accomplished by a print having opposite front and backsides, the front having visible image information. An accessible audio data storage means, for example, a randomly accessible nonvolatile memory, such as an EPROM or EEPROM, is positioned in a recess in the print, preferably in a recess in the backside of the print or is integral with the backside of the print. Although the audio data storage means preferably is accessible from the backside of the print, it can be accessible from the front.

The visible image information can be a single still image print or transparency. It can also be a multiple image print, such as, a dynamic or depth image. According to another aspect of the invention, the image information is an index print having a plurality of images representative of the images in a particular group, for example, images from a single roll of film. The audio data storage means for such a print is capable of holding separate audio data (sometimes herein called audio data segments or sound segments) for each of the plurality of images.

The preferred embodiments of the invention, especially those with the audio storage means accessible from the print backside, provide an extensive data storage for one or more substantial audio data segments associated with a print that does not objectionably increase the size of the print nor reduce, or visibly detract from the appearance of the image.

According to another aspect of the invention, the print is manufactured by affixing two sheets together, a first sheet containing the image information on a side defining the frontside of the sheet. The second sheet provides a recess for the audio data storage means and further provides increased stiffness for the print. Utilizing this aspect of the invention, the prints with the audio data storage means are readily mass produceable by a photofinisher. Further, according to another preferred embodiment, the recess for the audio data storage means provides a detent which can assist in locating the print in a player.

According to a preferred embodiment of the inventive method, a print having both image and audio is made by providing a substrate having first and second sides with a visible image on the first side, providing a recess in a second substrate, the second substrate having first and second sides and the recess being accessible, preferably from the second side of the second substrate, and positioning an accessible audio data storage means in the recess oriented to be accessible from the second side of the second substrate and affixing the second side of the first substrate to the first side of the second substrate.

According to another preferred embodiment, the audio data storage means is formed as part of an integral back to the print that can be applied by the customer after exposing an adhesive backing from the integral back. This preferred embodiment can also be effectively mass produced by a photofinisher.

According to another preferred embodiment, the audio data storage means is formed as part of an integral backing, which backing material is suitable for receiving on its frontside pictorial imagery; such as from an inkjet printer, thermal dye transfer printer or other electronic hard copy imaging means.

According to another aspect of the invention, a player apparatus for receiving a print, as described above, includes means for receiving the print in a receiving position with the pictorial image visible from a viewing side of the apparatus and including means responsive to one or more edges of the print for accurately positioning the accessible audio data storage means in the print with respect to the receiving means and means positioned opposite the received print from the viewing side of the apparatus for accessing an accurately positioned accessible audio data storage means.

According to a preferred embodiment, the means for receiving the print includes detents for engaging either detents in the edges of the print, detents formed by the recess in which the audio data storage means is positioned or a separate recess made for this purpose to hold and properly locate the print in the receiving means so that accurate alignment and contact to the audio data storage means is obtained. An advantage of this preferred embodiment is that accurate access to the audio data storage means can be obtained automatically on insertion of the print without the need for locating means extensively associated with the frontside of the print.

According to another aspect of the invention, the player includes means for receiving an index print of the type described above and for cooperating with the print locating means for positioning the index print in a predetermined location with the frontside viewable. The player also includes a touchscreen positioned to overlie a print in the predetermined location, through which touchscreen the images on the frontside of the index print are viewable, and means for receiving and accessing the accessible audio data storage means, including means for playing a selected audio data segment from the audio data storage means in response to a selection made with respect to one of the plurality of images utilizing the touchscreen. With this invention, touching the touchscreen over an image actuates audible playback of the audio data segment for that image.

According to another aspect of the invention, the player includes a memory into which any of the audio data can be conveyed and from which they can be moved into other prints or other positions on the same print. Thus, audio data associated with an image on an index print can be moved into memory and then later stored on an individual single image print which may be the same image or a different image. It also allows moving audio data segments between single image prints. An audio data can be copied to another image on a single index print without using the player memory.

According to another preferred embodiment, a microphone is provided in the player for recording or rerecording audio data in an audio data storage means.

According to another preferred embodiment, the player includes a display means, for example, a liquid crystal display, underneath a touchscreen which allows the player to provide soft buttons.

BRIEF DESCRIPTION OF THE DRAWINGS

FIGS. 2, 3, 6 and 7 are perspective, top, perspective and sections of a player apparatus usable with the print of FIG. 1, respectively.

FIGS. 27–57 show alternative displays available in a player apparatus and relate to the flow charts shown in FIGS. 14–26.

FIG. 58 is a schematic illustrating steps in forming audio data storage media for image-audio prints.

DETAILED DESCRIPTION OF THE INVENTION

This description will describe in detail several parts of a larger system in which both images and audio are captured in a camera, processed by a photofinisher into an image-audio print and then viewed and played by a player or otherwise utilized. Although recording, rerecording and copying is a capability of the player apparatus shown in many of the FIGS., for the most part, the audio associated with the image-audio print is captured at the time of picture taking. This can be done by any process shown in the prior art and is not part of this invention. For example, it can be accomplished by recording the audio on the same film that the picture is recorded upon, as shown in U.S. Pat. Nos. 5,353,158; 5,389,989; 5,363,157 and 5,276,472, described above. It can be captured in a digital camera, such as is presently done in the Kodak DCS420 electronic camera. Although somewhat less convenient, the audio can also be recorded by apparatus separate from the camera on a separate storage medium which is put together with the print, preferably by the photofinisher, in forming the image-audio print.

Figure 1:
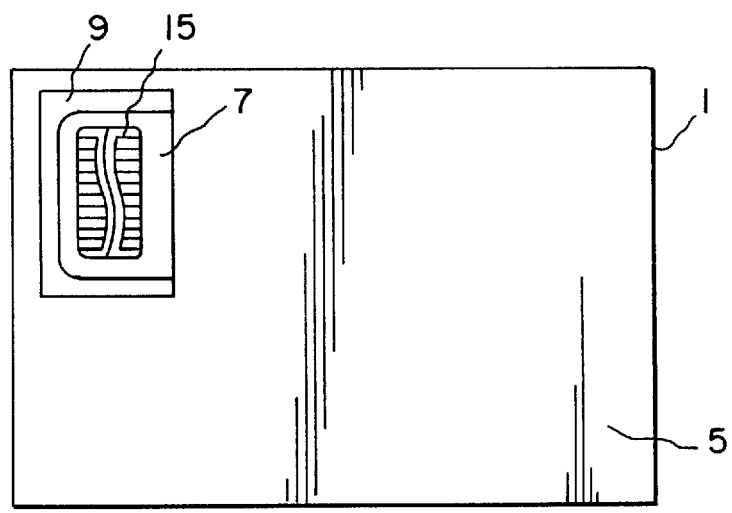
FIGS. 1 and 8 are alternative embodiments of an image-audio print.
Figure 5:
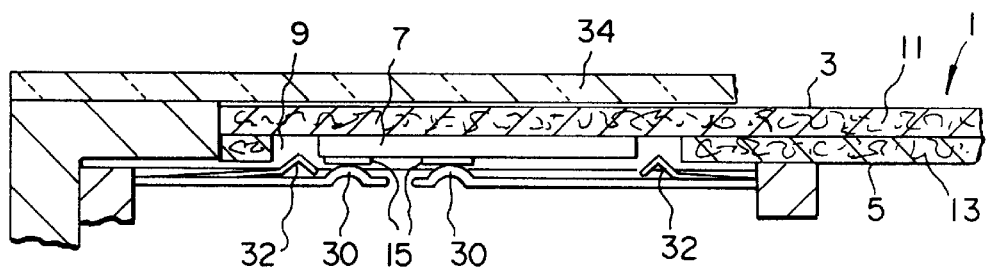

Referring to FIGS. 1 and 5, an image-audio print 1 includes a frontside 3 and a backside 5. The frontside 3 contains pictorial image information, for example, an image forming an ordinary 4×6 photographic print, an index print with a plurality of images or a "depth" or "dynamic" image which can give the illusion of depth or motion, etc. The image information can be made by conventional silver halide photography or other comparable processes, including thermal dye transfer, electrophotography, inkjet, etc. Although some of these processes may not be considered "photography" in the strictest sense of the word, the print 1 will sometimes be referred to herein as a "photographic print" regardless of the actual process in making the image.

The print 1 also includes an accessible audio data storage means 7, preferably positioned in a recess 9 in the backside 5 of the print or in an integral back (FIGS. 64–67). Audio data storage means 7 can be any accessible means for storing audio data but is preferably a randomly accessible nonvolatile memory, such as, an EEPROM. An example of a suitable EEPROM is the "SSFDC" (solid state floppy disc card) manufactured by Toshiba.

Manufacture of the image audio print 1 will be described in more detail below with reference to FIGS. 58–61 and 65–68. In one embodiment, referring to FIGS. 1 and 5, print 1 is made of two laminated sheets 11 and 13. Sheet 11 is a frontside sheet containing the photographic image and sheet 13 is a backside sheet containing the recess 9 for the storage means 7 and adding some heft to the print. In manufacture of image audio print 1, audio data is stored in storage means 7 for access through input/output interface contacts 15.

Many of the advantages of print 1 will be illustrated with a discussion of its use and its manufacture. However, a primary advantage of the embodiment shown in FIG. 1 is that the audio data storage means 7 is accessible from the backside of the print, leaving the entire frontside for a conventional 4×6 image (for example) with or without margins. Thus, the audio data storage means does not detract from the image and, in fact, is not apparent while viewing the frontside image. It does not require relative movement between the print and a player to access and it will not have a substantial tendency to degrade in time.

FIGS. 2–7 show an embodiment of a player apparatus 20 (sometimes called a "player") designed to receive print 1 with its frontside visible and to access and play audio data stored in the audio data storage means. In its preferred form, the player is also capable of recording, copying and rerecording of audio data on the audio data storage means of a print.

Figure 2:
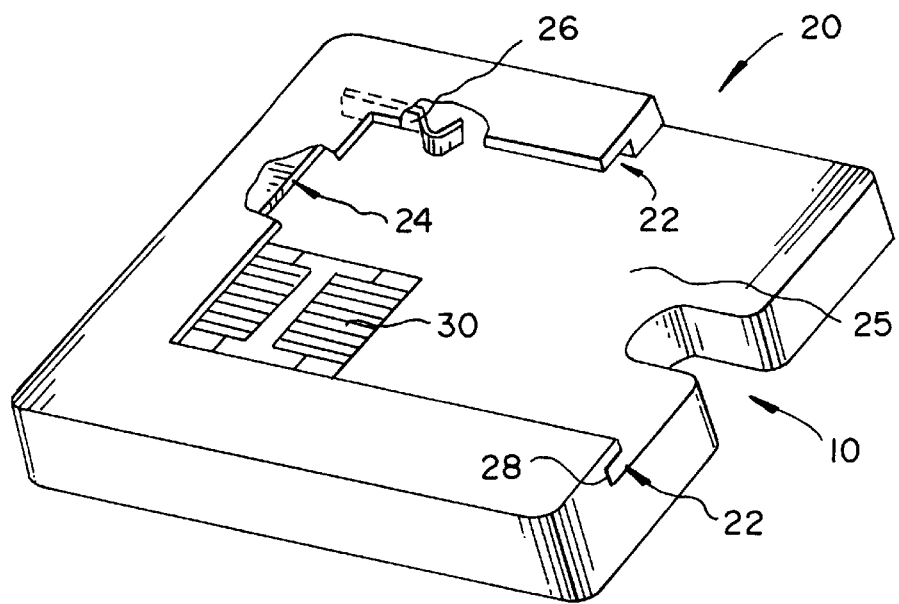

Referring to FIG. 2, player 20 includes a housing defining a slot 22 for receiving print 1 with its frontside facing upward. The print is pushed all the way into slot 22 until it engages a back wall 24. A leaf spring 26 urges the print against an opposite sidewall 28 to help accurately position the long edges of the print with respect to the receiving mechanism. The bottom of the slot is defined by a bottom wall 25, and a notch 10 enables easy grasp of a print.

Figure 3:
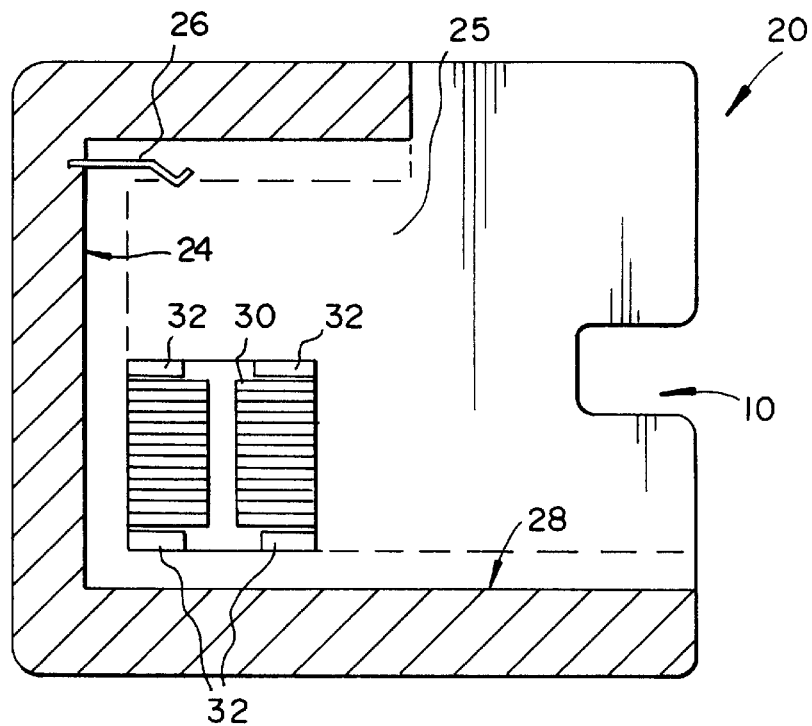
Figure 4:
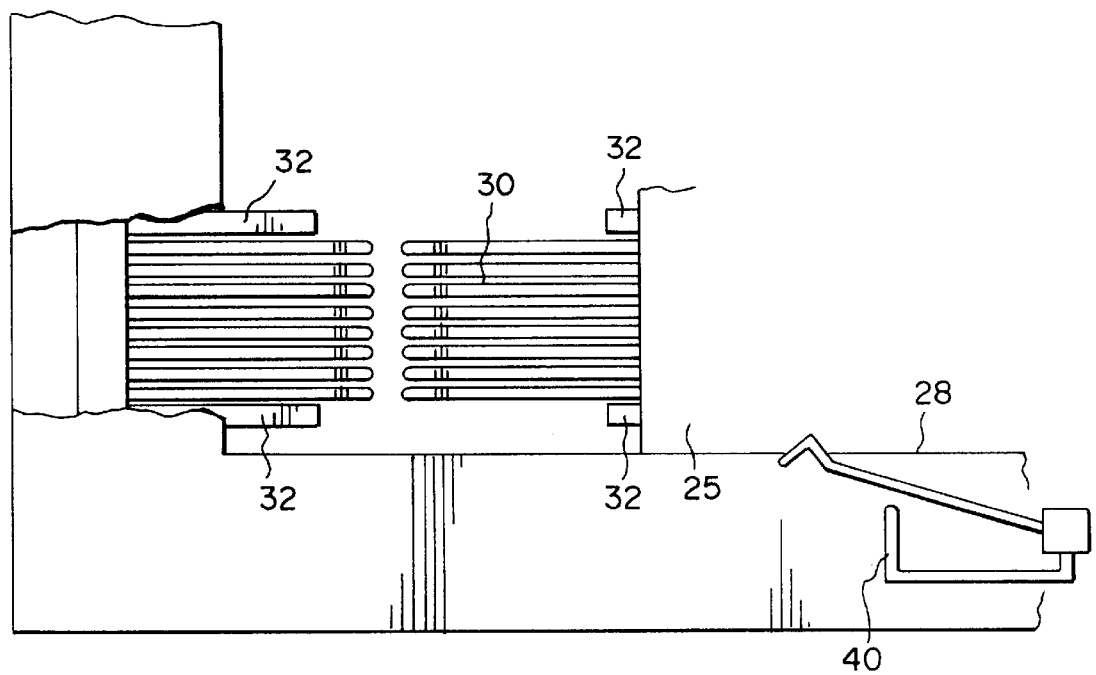
FIGS. 4 and 5 are top and section views of a portion of a player apparatus.

In the lower left hand corner of bottom wall 25 (as viewed in FIG. 3) is a set of leaf spring electrical contacts 30 positioned to make electrical contact with the input/output interface contacts 15 on a received print. The set of electrical contacts 30 include two rows of contacts, as best seen in FIGS. 4 and 5. Adjacent electrical contacts 30 are four locating leaf springs 32. The locating leaf springs 32, as shown in FIG. 5, are positioned to fit into a space around storage means 7 in recess 9. The leaf springs 32 are detent means which form with the edges of the recess 9 (also a detent means) a suitable detent for accurately positioning the contacts 30 with respect to the input/output interface contacts 15 of storage means 7. In this embodiment (but not in all embodiments), recess 9 is larger than storage means 7 to provide a space of sufficient size to receive detent means such as leaf springs 32. Leaf springs 32 and leaf spring contacts 30 are biased upward into engagement with received print 1. In the embodiments shown in FIGS. 2–5, the leaf spring 26 forces the print 1 against opposite sidewall 28 and assures the accurate location in one direction (up and down, as seen in FIG. 3), while the detents provided by locating leaf springs 32 assures accuracy in the other direction (left to right, as seen in FIGS. 3 and 4).

Note that locating leaf springs 32 cooperate with recess 9 to form four detents that are somewhat over-constrained. That is, the actual position of the contacts 15 of the storage means 7, with respect to contacts 30, is dependent upon an average position provided by the four springs 32 within the tolerances of the devices. Slightly more accurate positioning could be obtained by using only the leftmost leaf springs 32, as shown in FIG. 4, to engage the leftmost edge of recess 9 to urge the print against backwall 24. This force (in cooperation with spring 26 urging the print against opposite sidewall 28) provides extremely accurate positioning of the print. (See also, the embodiment shown in FIGS. 61–63.) However, sufficient accuracy for proper contacting of these particular elements is obtained with the four-spring approach shown in FIG. 4 with the added advantage that the additional two detents hold the print more securely in the player.

A "power-on" switch 40 (FIG. 4) is closed when a print is received and forced against sidewall 28 to power up the player electronics and begin any subroutines dependent upon that powering up.

The embodiment shown in FIG. 2 does not show a covering over a print in slot 22 aside from marginal overhangs. This is the simplest form of the receiving portion of the player. However, as shown in FIGS. 5, 6 and 7, slot 22 is preferably covered by a transparent cover 34. This eliminates the need for the overhangs, providing full view of the entire image. As shown in FIG. 7, cover 34 is preferably a touchscreen whose full use, with respect to index prints, will be explained below. Cover 34 (herein sometimes called "touchscreen 34") also covers a liquid crystal display 36 which can further utilize the touchscreen characteristics of the cover. This enables the player electronics to display software reconfigurable menu "buttons," herein called "soft buttons" and to receive input from them. FIG. 6 also shows a speaker 38 and a microphone 39 whose use will be explained below.

Note that the right edge 35 of cover 34, shown in FIG. 6 contains no opaque border. This allows receipt and viewing of panoramic image-audio prints having a greater long dimension than the ordinary print. A retractable or swingable pan arm 37 can be moved from a storage position to an operative position, as shown to support the "pan print."

Figure 8:
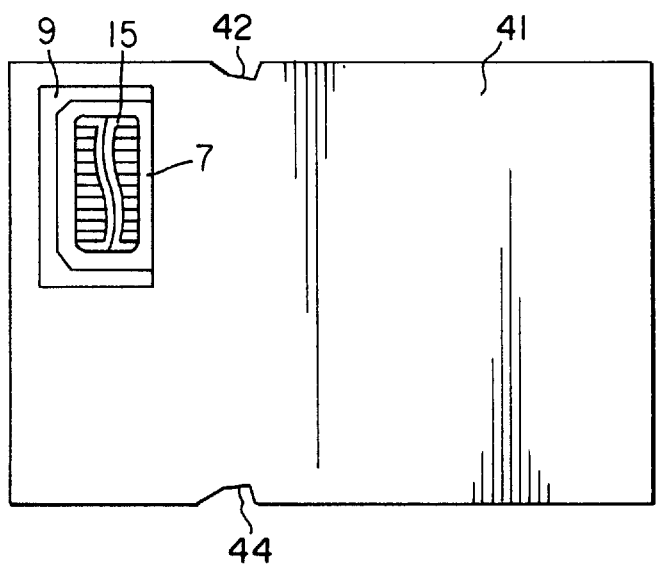
Figure 9:
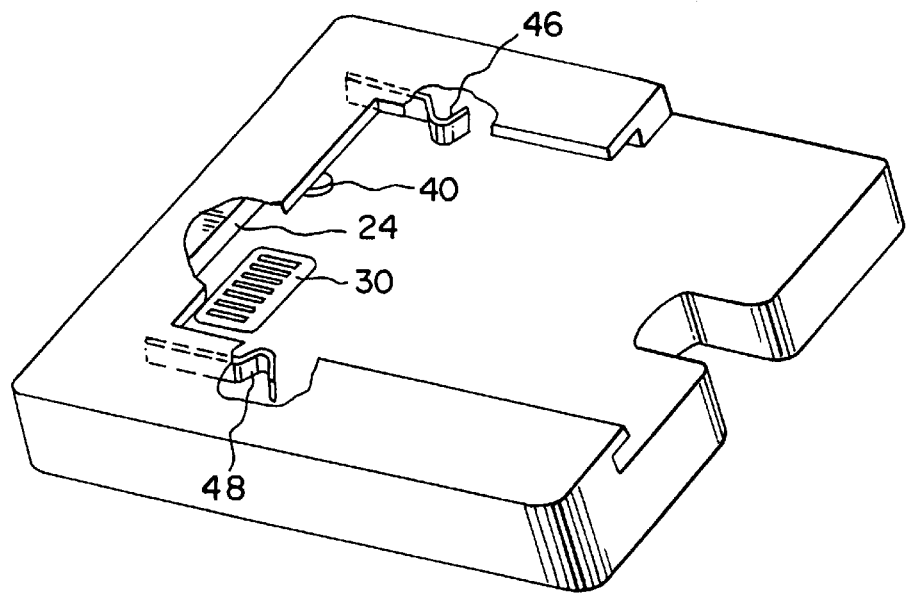
FIGS. 9 and 10 are section and top views of an alternative player apparatus usable with the print of FIG. 8.
Figure 10:
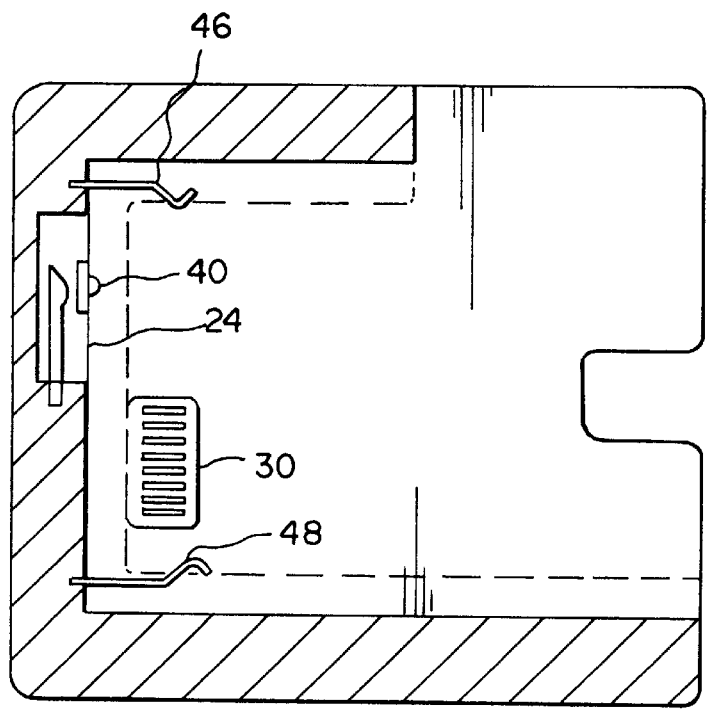

FIGS. 8, 9 and 10 show an alternative embodiment of the image-audio print and player in which the primary difference is in the means for locating the print in the player with respect to electrical contacts 30. As shown in FIG. 8, image audio print 41 is constructed as in FIG. 1 except that the opposite longer edges of the print contain notches 42 and 44. A pair of leaf springs 46 and 48, shown in FIGS. 9 and 10 engage notches 42 and 44 to form a detent securing the print against backwall 24. A power-on switch 40 is located in backwall 24. This locating structure is somewhat more simple than that shown in the first embodiment, but it has the disadvantage of having notches in the print backing, and the actual location of the print is dependent upon the relative forces from springs 46 and 48.

Figure 61:
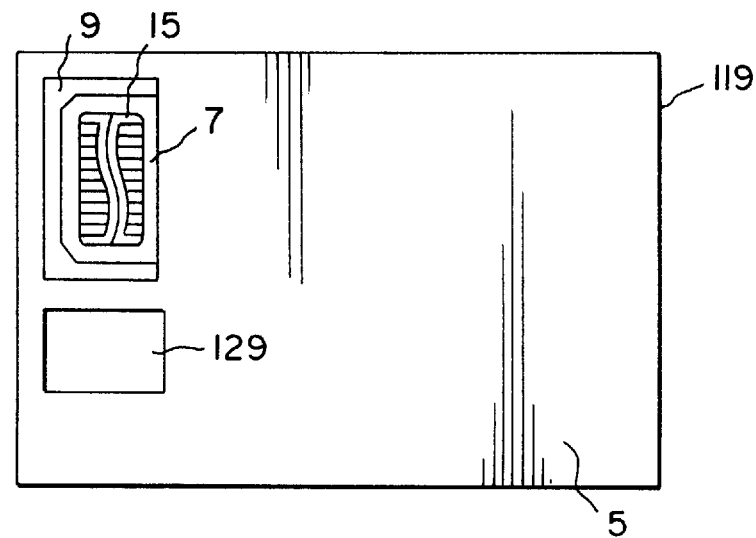
FIG. 61 is a rear view of alternative image-audio print.
Figure 62:
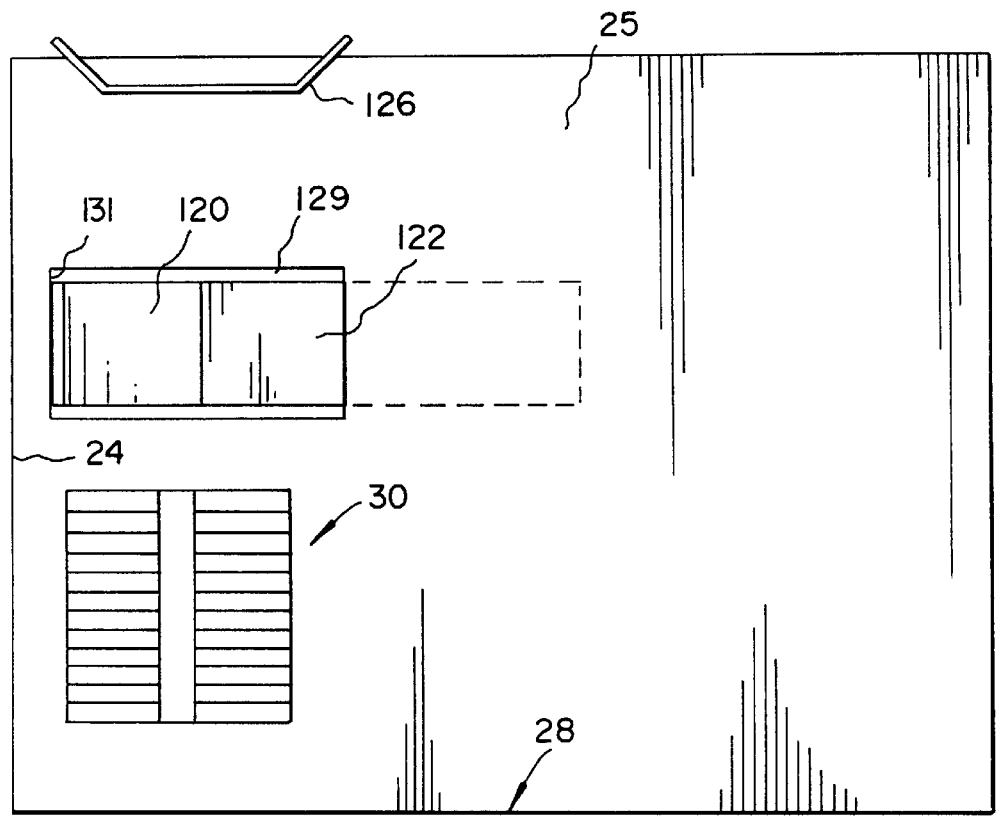
FIGS. 62 and 63 are top and sectional views, respectively, of the receiving portion of a player apparatus for receiving the print shown in FIG. 61.
Figure 63:
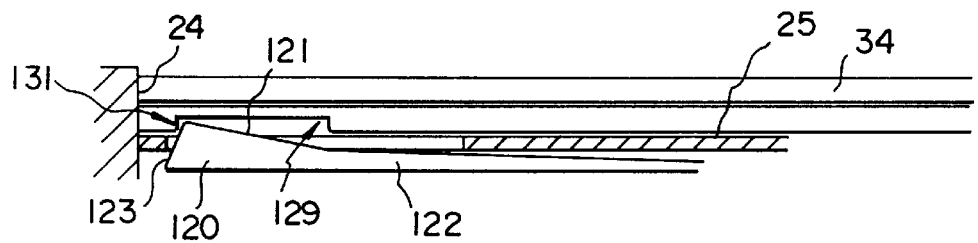

FIGS. 61–63 show another embodiment of a print-player locating interface similar to that shown in FIGS. 1–5. Referring to FIG. 61, image-audio print 119 is the same as print 1 in FIG. 1, except that an additional recess 129 has been formed in backside 5. Recess 129 can be formed in the same way as recess 9, to be discussed in more detail below. Referring to FIGS. 62 and 63, the receiving player has a flat spring finger 126 which urges print 119 (not shown in FIG. 62) against opposite wall 28. A detent finger 120 is spring urged by a spring leg 122 upward through an opening in floor 25 of the player. Detent finger 120 has a ramp surface 121 over which print 119 slides until an edge 131 of recess 129 is engaged by a steep ramp surface 123 which forms with the recess edge 131 a detent resisting removal of the print and urging it against wall 24. Steep ramp surface 123 is overridden, pushing detent finger 120 downward in response to a strong removal force on the print. In both this embodiment and the one shown in FIGS. 2–5, the detent spring force has a tendency to urge the print away from contact with contacts 30, so those contacts are preferably spring urged, either as a unit or individually, to a position high enough in the path of the print to maintain such contact.

Figure 11:
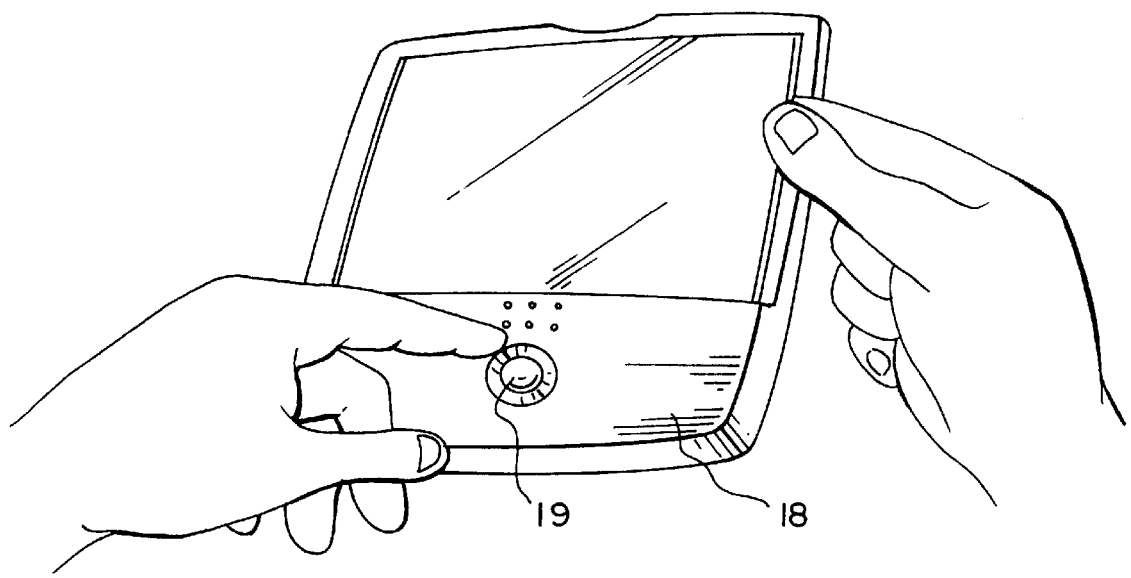
FIGS. 11 and 12 are perspective views of alternative player apparatus.
Figure 12:

FIGS. 11 and 12 illustrate contrasting embodiments with respect to certain aspects of the invention. According to FIG. 11, control of a simplified version 18 of the player is maintained by actuating one or more buttons 19. The player can be as simple as a play only system in which the already recorded audio associated with the image in the player is played on the press of a single button 19, or even simply closing of a power-on switch by the insertion of the print.

FIG. 12 shows a more sophisticated version of player apparatus 20 in which touchscreen 34 is used to select one of a plurality of images on an index print, and in doing so actuates the audio data segment associated with that image. In this version further control of the apparatus, in terms of playing, recording, copying, or the like, is actuated utilizing touchscreen 34 with respect to liquid crystal display 36 (FIG. 7), which forms variably labeled "soft buttons," known in the touchscreen art. Although the liquid crystal display is convenient and cooperates well with the touchscreen 34, especially in handling index prints, most of the same functions can alternatively be carried out by a series of buttons.

FIGS. 64–67 show several embodiments in which the audio storage means is accessible from the front of the print. These embodiments are illustrated to demonstrate the breadth to which some aspects of the invention can be applied. They also illustrate, by contrast, some of the advantages associated with the image audio prints shown in the other FIGS.

Figure 64:
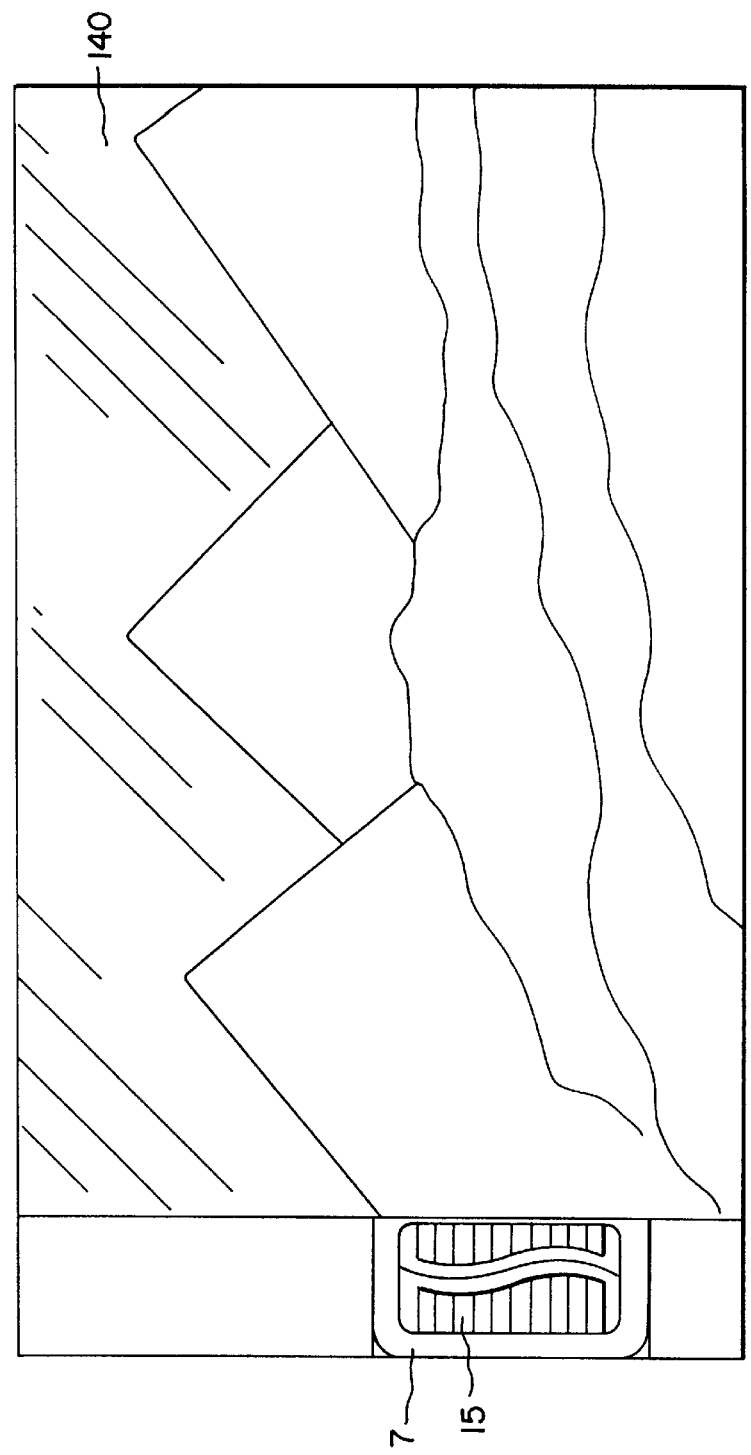
FIGS. 64 and 66 are alternative image-audio prints.
Figure 65:
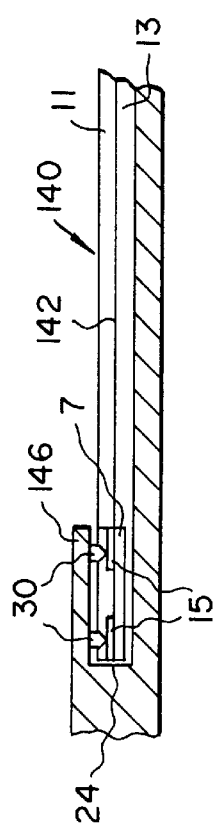
FIGS. 65 and 67 are side sections of a portion of the receiving player apparatus for the prints shown in FIGS. 64 and 66, respectively.

Referring to FIGS. 64 and 65, an image audio print 140 includes an accessible audio storage means 7 as in the earlier embodiments. It includes a backside sheet 13 which has no backside recess or cutout and can be somewhat thinner than the backside sheets of the previous embodiments. The frontside sheet 11, when assembled to a recessed front surface 142 of backside sheet 13, forms an image audio print of uniform thickness. The audio storage means 7 is integral within backside sheet 13, but in this embodiment, it is assembled with its contacts 15 facing to the front of the image-audio print 140. As shown in FIG. 65, the print is inserted into a player having an overhang 146 which includes a set of electrical contacts 30 illustrated schematically in FIG. 65 but which can be similar to those shown in FIGS. 4 and 5. Image audio print 140 can be located in a player in the same manner as shown in either FIGS. 2–5, FIGS. 9–10 or 61–63. Assembly of the print would be similar to that for the print shown in FIG. 1, except that, in addition to an aperture in the backside sheet 13, there would also need to be a recess level for frontside sheet 11. Note that the audio storage means 7 would still be adhesively affixed to the second side of the backside sheet 13.

Figure 66:
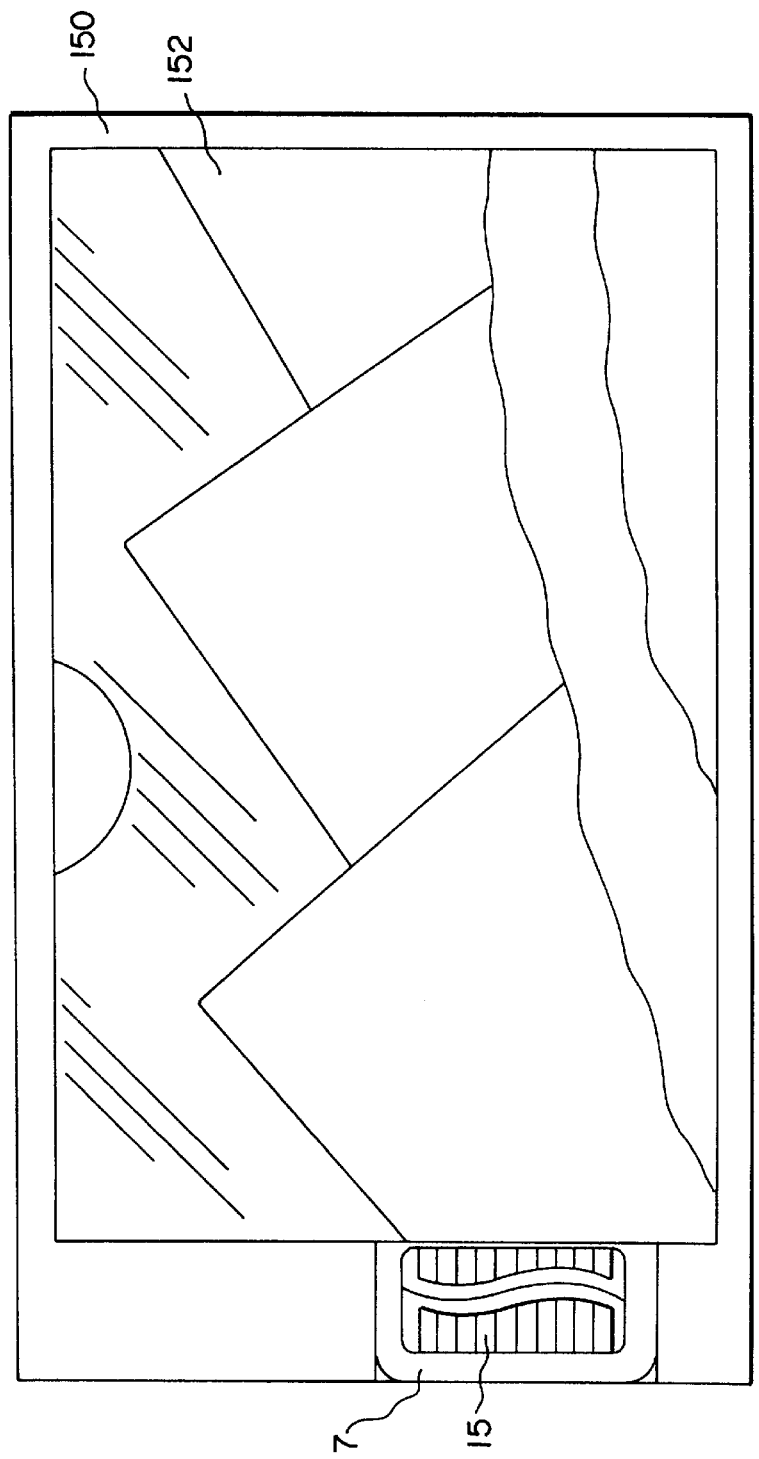
Figure 67:
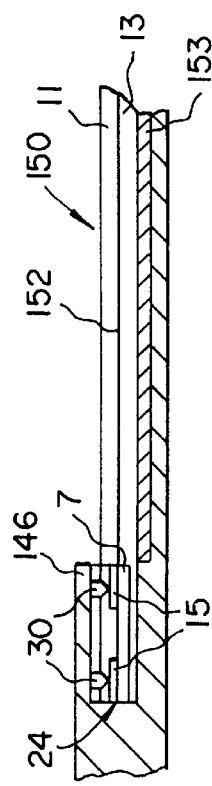

FIGS. 66 and 67 illustrate an embodiment in which an image audio print 150 includes a backside sheet 13 which has a complete aperture cutout 152. This sheet is designed for use with transparent images like slide film or Duratrans. In this example, the backside sheet is adhesively attached to a transparent frontside sheet 11 along the perimeters. Backside sheet 13 contains an audio storage means 7 affixed by adhesive. In this example, electrical contacts 15 face the frontside of the "image-audio print," and again, are engageable by suitable contacts 30 in an overhang 146 in the player. As shown in FIG. 67, the player can also have a cover or touchscreen in any of the embodiments.

Figure 13:
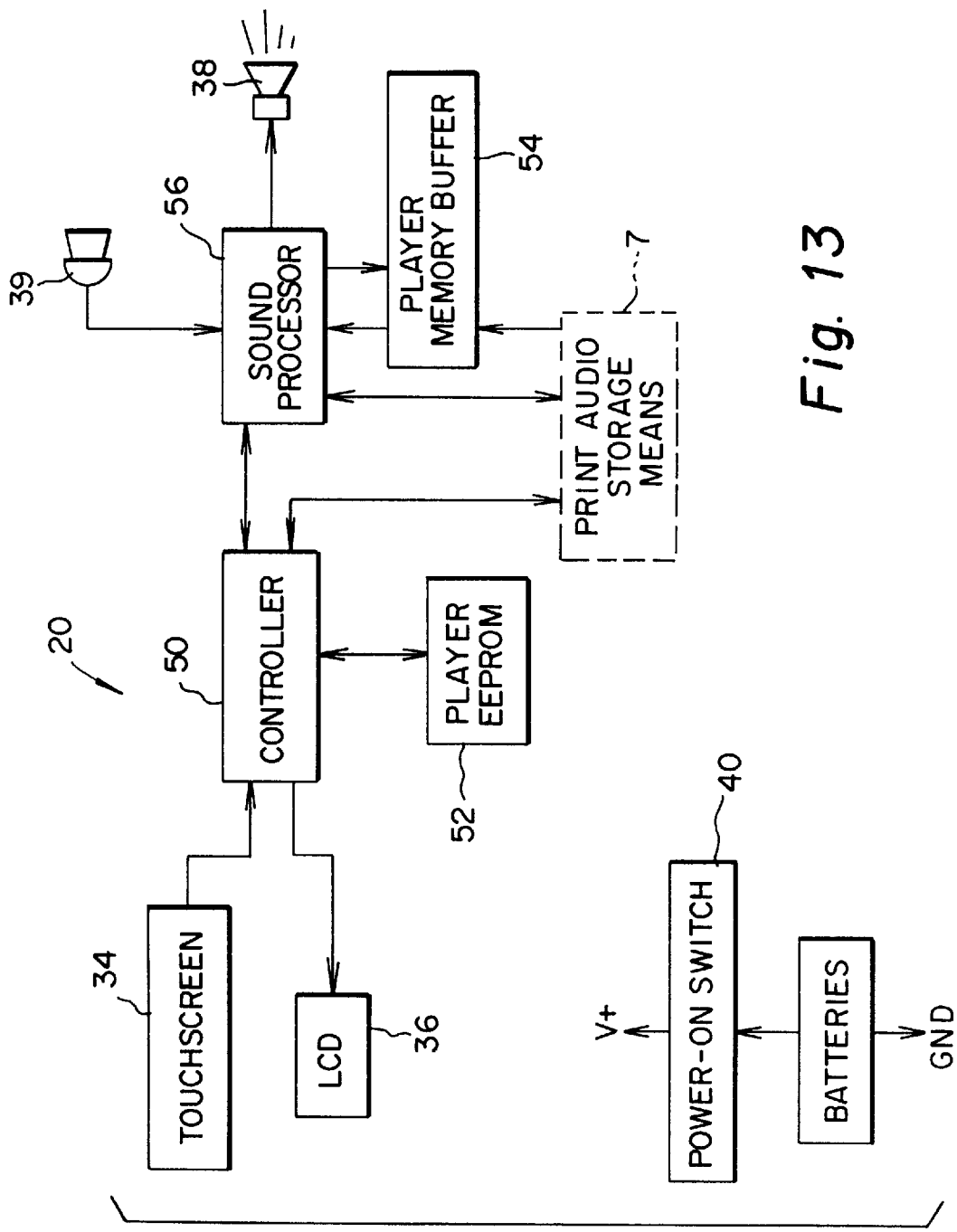
FIG. 13 is a schematic of the electrical controls for a player apparatus.

The capabilities of player apparatus 20 will be illustrated with the use of a schematic shown in FIG. 13, flow charts in FIGS. 14–26 and representations of the liquid crystal display panel shown in FIG. 27–57.

According to FIG. 13, player apparatus 20 includes speaker 38, microphone 39, touchscreen 34, LCD 36 and power-on switch 40, all discussed above. It also includes a controller 50 having its own player EEPROM 52, a player memory buffer 54 and a conventional audio processor 56. The controller 50 displays options to the user on LCD 36, receives user input via the touchscreen 34 over the LCD soft buttons displayed and stores control parameters in player EEPROM 52. Controller 50 also controls sound recording and playback by directing print audio data storage means 7, sound processor 56, speaker 38 and player memory buffer 54. Controller 50 can have an internal timer to carry out many of the features of the player apparatus 20. The operation of the player with respect to FIG. 13 will be best understood by explaining the flow charts in FIGS. 14–26. The usefulness of the liquid crystal display (LCD) 36 will also be apparent from this discussion by reference to FIGS. 27–57.

Figure 14:
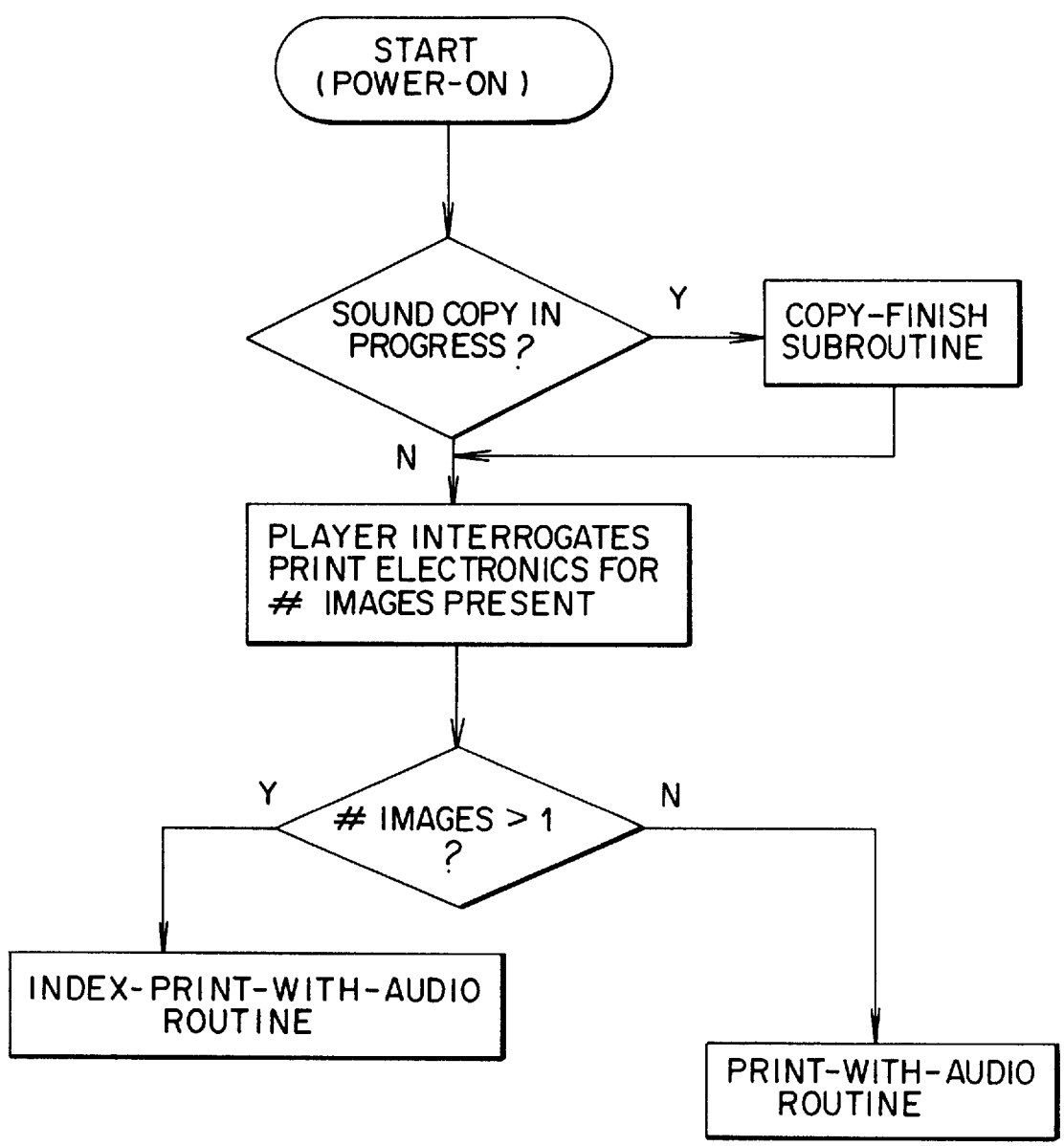
FIGS. 14–26 are flow charts of various subroutines for a player apparatus.
Figure 27:
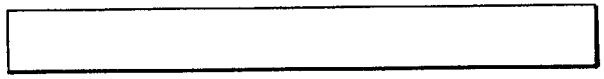

FIG. 14 illustrates the main routine that begins on power-up with receipt of a print. As shown in FIG. 27, the liquid crystal display 36 (sometimes called "LCD panel") is blank when the power is off. As shown in FIG. 14, when the print is inserted and power-on switch 40 is closed, the electronics are powered up. Controller 50 first interrogates player EEPROM 52 to find out if an interprint audio copy (to be explained) is in progress. If it is, a copy finish subroutine (see FIG. 24) is begun, if there is no copy in progress, the controller interrogates the print audio data storage means 7 to determine the number of images present on the print. If the number of images exceed one, it proceeds with an "Index-Print-With-Audio" routine. If the audio data storage means for the print indicates that there is only one image on that print, the controller initiates a regular "single image" routine, labeled "Print-With-Audio Routine."

Figure 15:
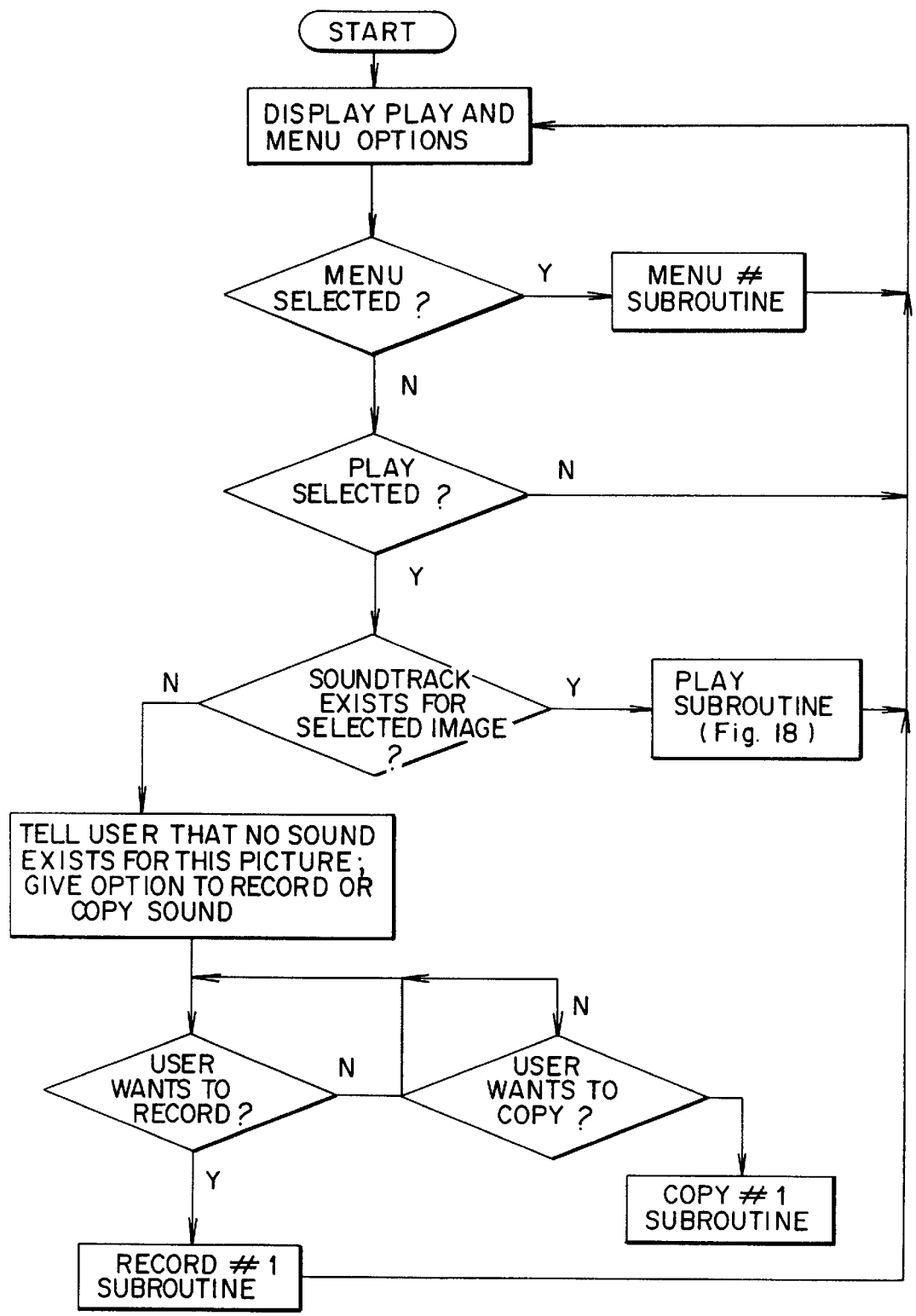

FIG. 15 illustrates the initial single image routine ("Print-With-Audio Routine"). The LCD first displays PLAY and MENU options, as shown in FIG. 28.

Figure 17:
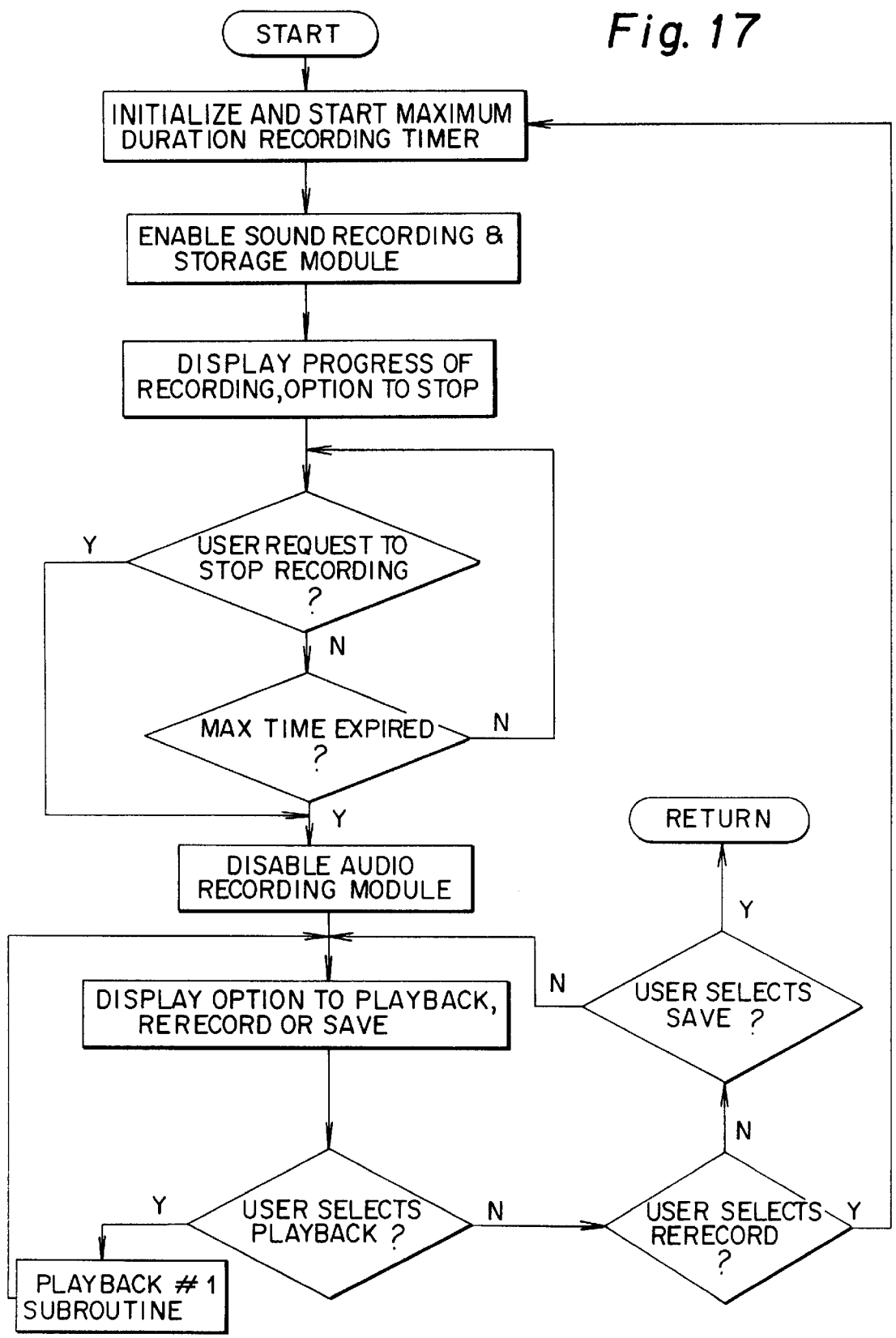
Figure 18:
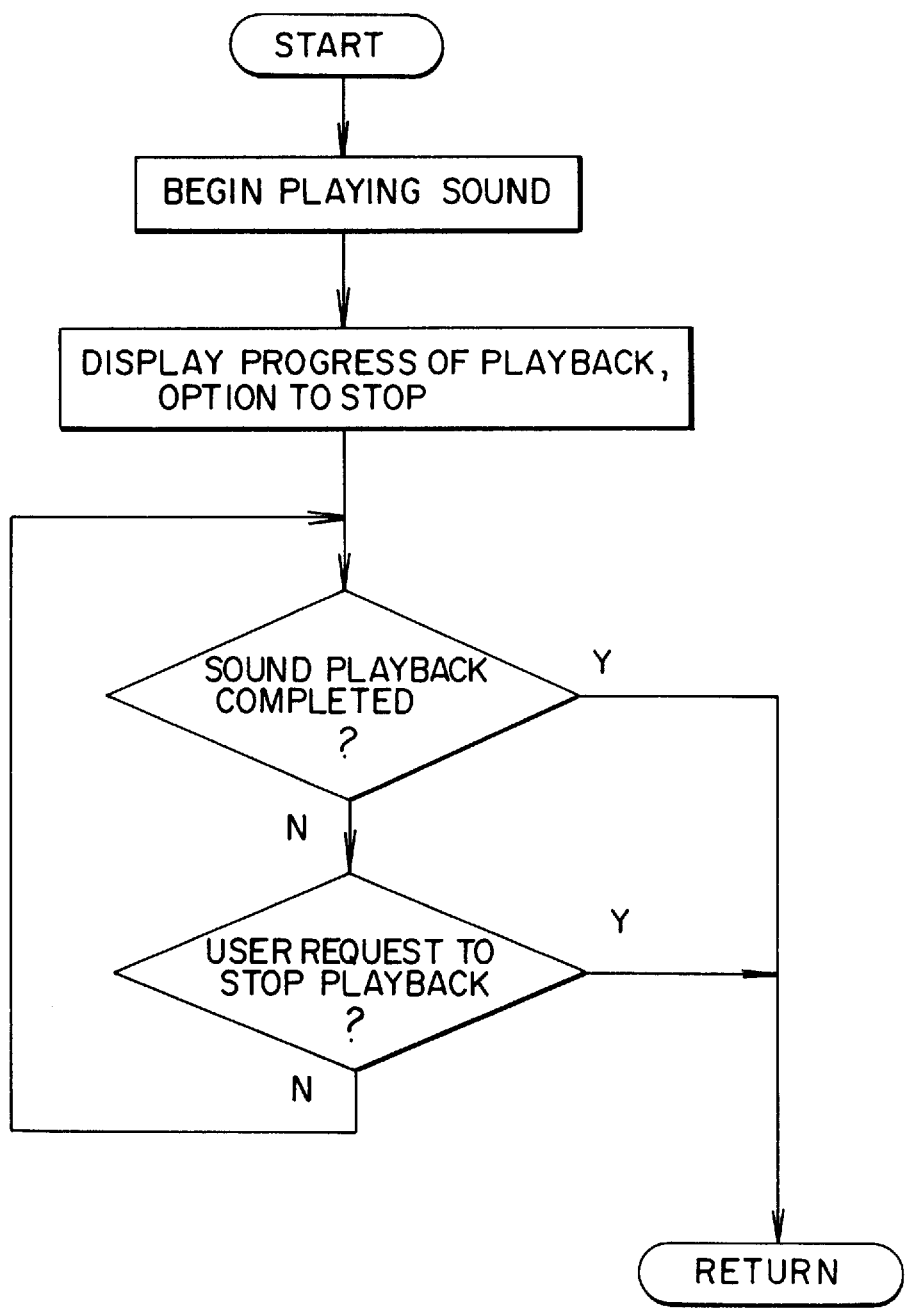
Figure 19:
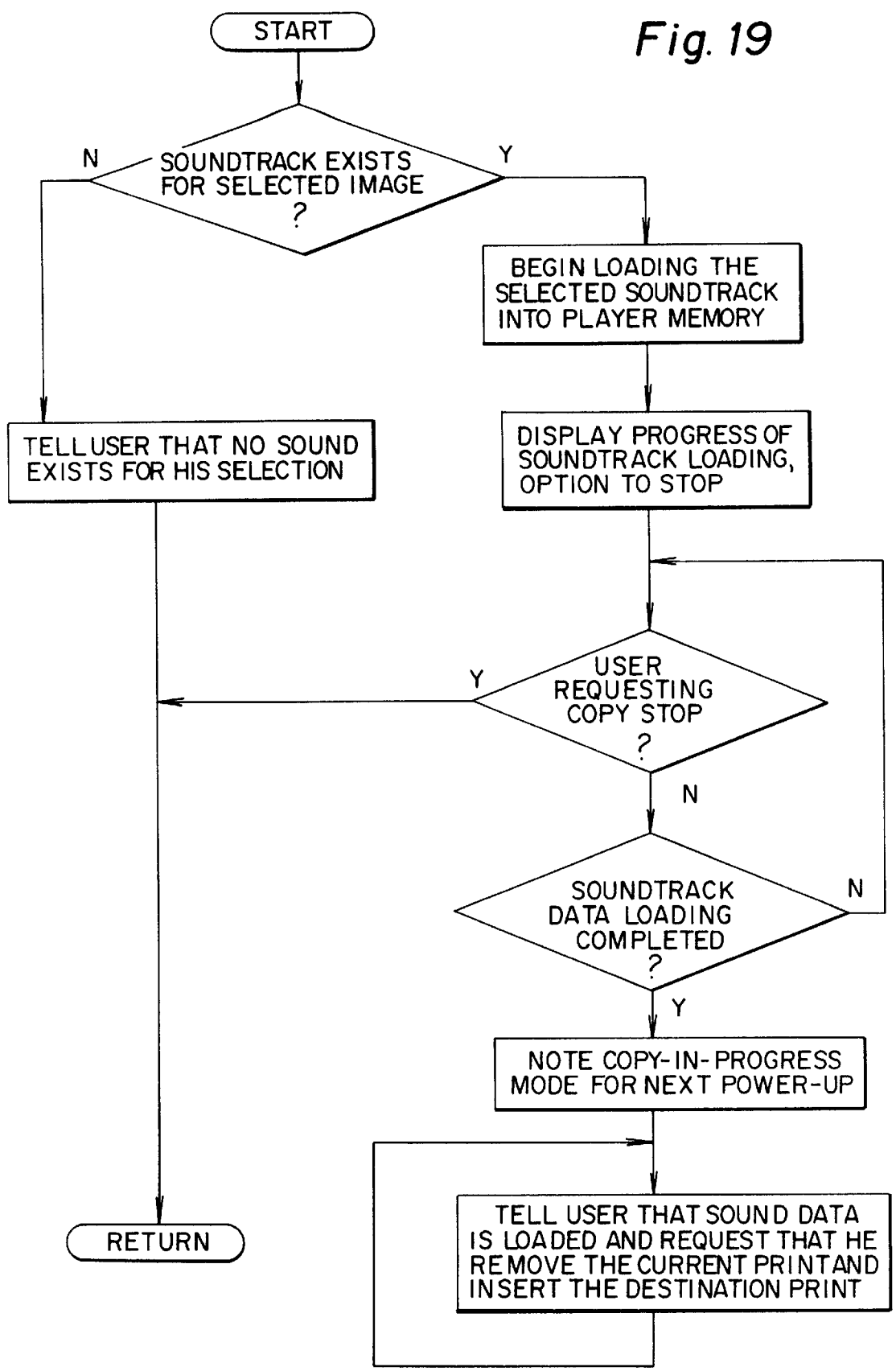

If PLAY is selected and an audio recording exists, the routine to play back audio, shown in FIG. 18, is begun. The data from the audio data storage means 7 is fed to audio processor 56 which continually transforms it to drive speaker 38. The LCD panel (FIG. 29) shows a progress bar 60 as well as a soft button to touch to STOP playback at any time. The progress bar 60 proceeds from left to right, indicating the amount of the available audio that has been played back. If STOP playback is touched, the LCD panel reverts to its beginning display shown again in FIG. 30. Referring again to FIG. 15, if no audio is recorded yet for this selected image, that is indicated to the operator, as shown in FIG. 31 with a soft button option to RECORD or COPY. If the user presses RECORD, the controller goes to a RECORD subroutine (FIG. 17). If the user presses COPY, the controller goes to COPY subroutine (FIG. 19).

Figure 16:
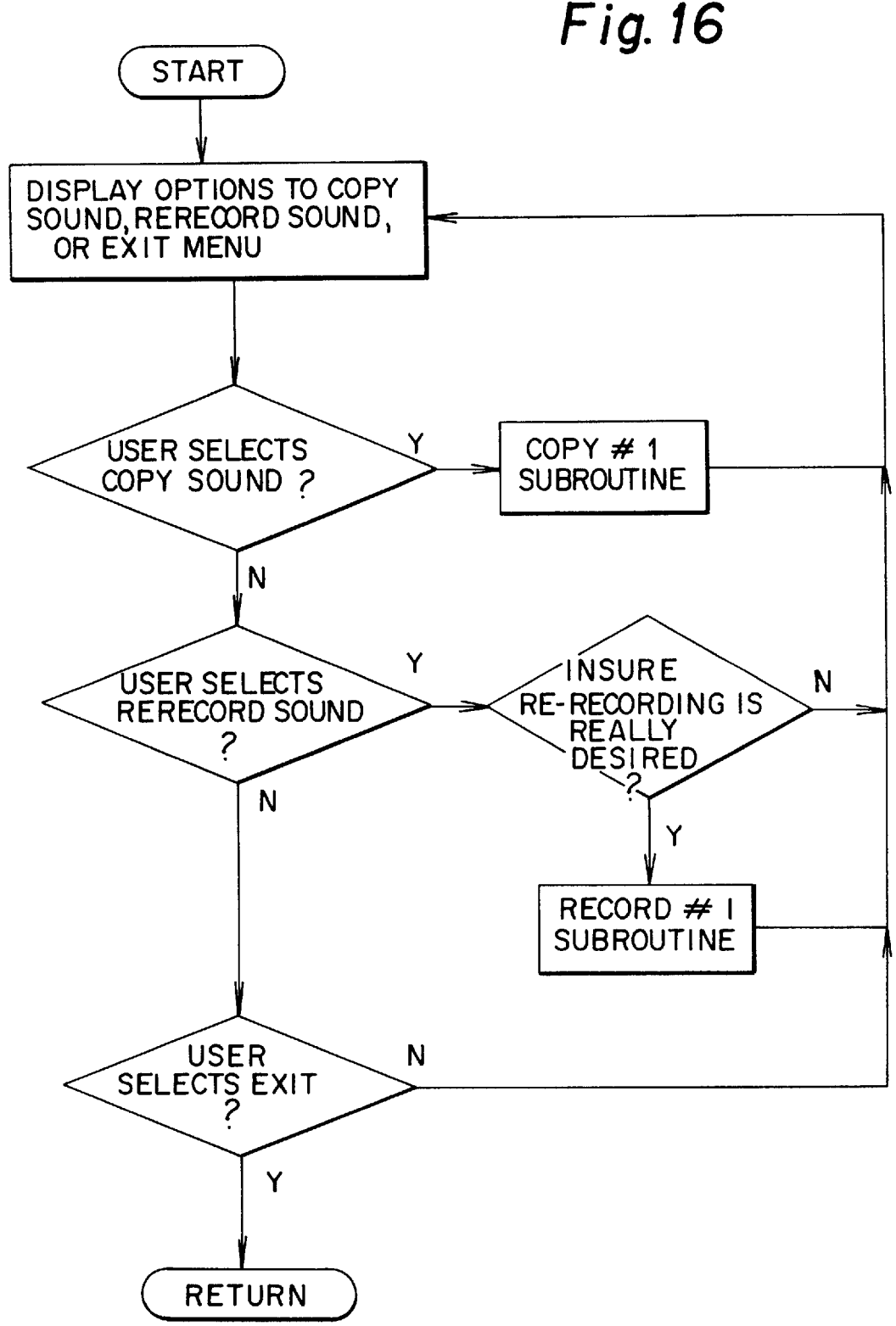
Figure 28:
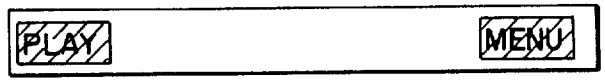
Figure 29:
Figure 30:
Figure 31:
Figure 34:
Figure 35:
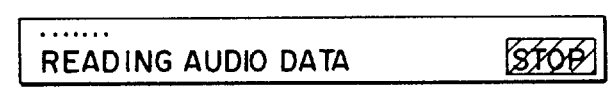
Figure 36:

If the MENU option is selected in the FIG. 28 or 30 display, a menu, shown in FIG. 34, is displayed offering COPY, RERECORD and EXIT options. If the user selects any of these options, the controller proceeds to the appropriate subroutine, as shown in FIG. 16.

Figure 32:
Figure 33:

FIG. 17 illustrates a recording or rerecording routine initiated by touching RECORD or RERECORD on displays shown in FIGS. 31, 33 or 34. The controller first initializes and starts a maximum duration recording timer which would allow, for example, a 30 second recording. It then enables audio recording allowing the user to speak or otherwise impart audio through the microphone 39 or an audio input jack, not shown. During this time, the display is as shown in FIG. 32 with a STOP recording soft button and also a progress bar display. The progress bar is useful in indicating to the operator how much of the available recording time remains so that the user can gauge his recording activity. If the maximum time expires during recording or if STOP is touched, the audio recording is halted, and a menu shown in FIG. 33 is displayed. The menu allows the operator to PLAY the audio just recorded or to start all over again with a RERECORD.

If the RERECORD option is selected, as shown in FIGS. 33 and 34, the program returns to the beginning of this record program (FIG. 17) to repeat the recording process.

Figure 37:

If COPY (FIG. 34) is touched, the controller begins a program illustrated in FIG. 19 to copy the data from the audio data storage means of one single image print to the audio data storage means of another single print. As shown in FIG. 19, the controller 50 first makes sure that an audio recording exists for the print from which the audio is to be copied. It then loads ("reads") the audio data into the player memory buffer 54 while showing the display shown in FIG. 35 with an appropriate progress bar and a STOP soft button. When the audio data loading is completed, that information is displayed as in FIG. 36, telling the user to insert the next print. The user then removes the print from which the audio has been copied into the player memory buffer 54 and inserts the other print into which the audio is to be recorded. The player automatically records ("writes") that audio data without further prompting while displaying its progress, as shown in FIG. 37, with an appropriate progress bar and STOP soft button.

The routines shown in FIGS. 20–26 and the display shown in FIGS. 38–57 are particularly applicable to the use of the image audio print player with an index print. Preferably, the index print is used with a touch screen in which each image can be selected by a touch of the screen over the image, as illustrated in FIG. 12. However, the routines can be adapted for use without a touchscreen with identification of the appropriate image being done by hard or soft buttons or other similar indicating mechanism to select or identify the image of interest by image number or by column and row. The index image-audio print (FIG. 1 or FIG. 8) has an audio data storage means 7 with capacity for storage of a full-length audio data segment for each image on an index print. Each such audio segment is separately accessible by the player through the audio data storage means interface. The player can recognize an index print by the number of audio data segments (all located in the EEPROM) or a separate indication parameter in audio data storage means 7 for that purpose.

Figure 20:
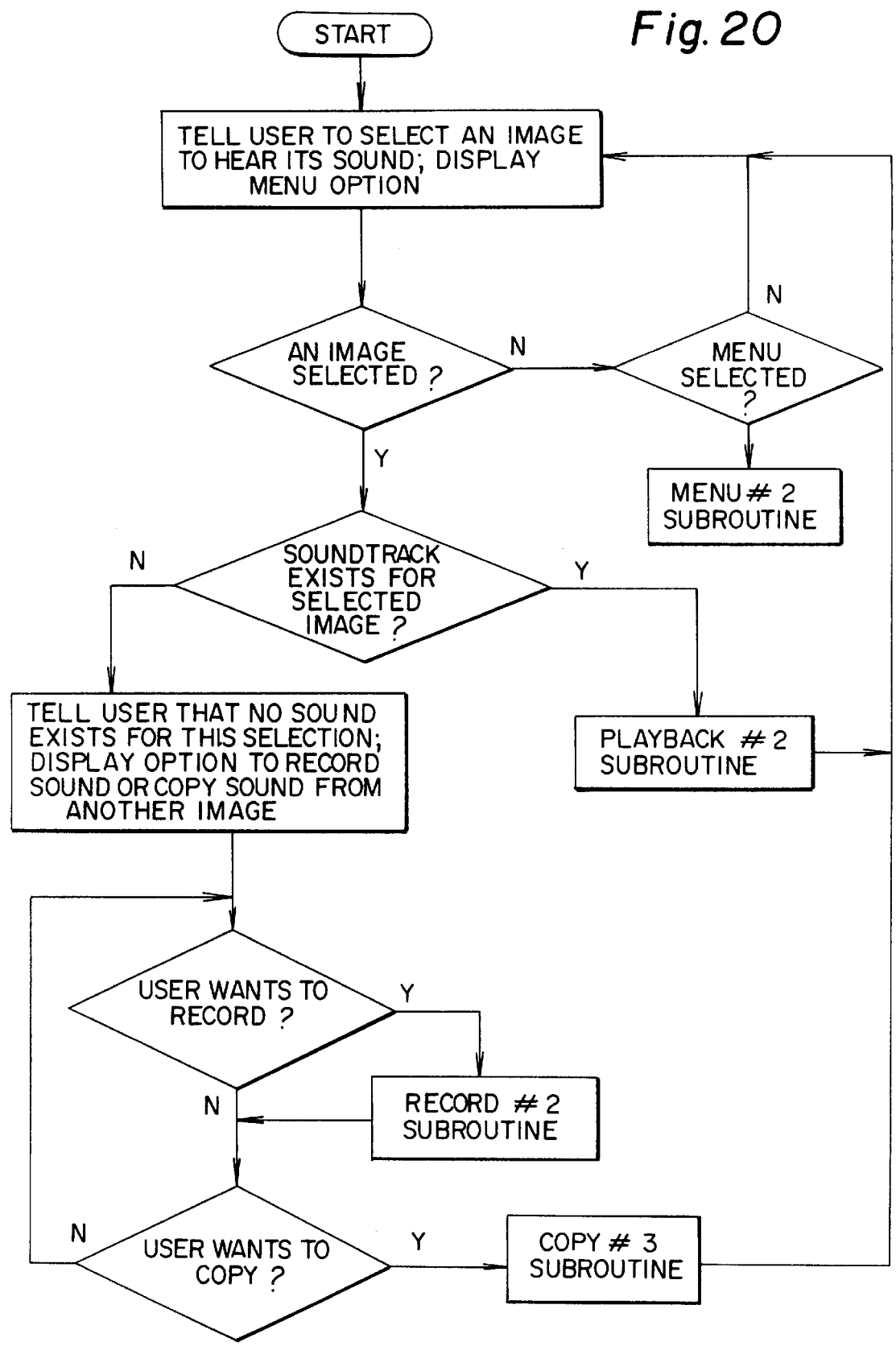
Figure 39:
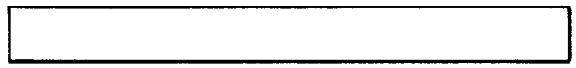

Referring to FIG. 20, before the player is powered up, the LCD display is again blank, as shown in FIG. 38. When an index print is received and (as illustrated in FIG. 14) the player determines from its audio data storage means 7 that an index print has been received, the display instructs the user to touch an image to play audio, as shown in FIG. 39. The user also is given a second option of a MENU, also as shown in FIG. 39.

Figure 23:
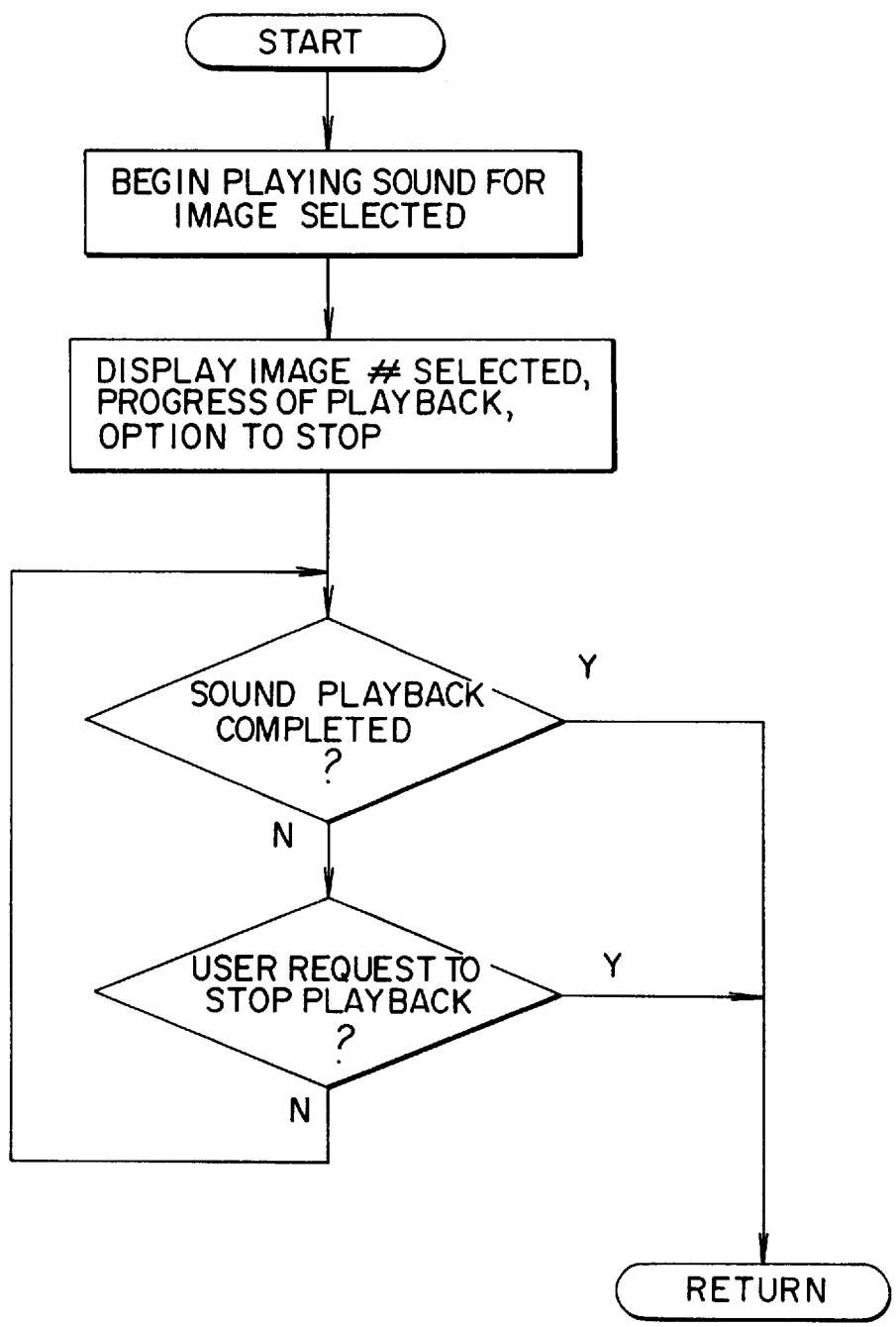
Figure 40:
Figure 41:

As shown in FIG. 23, an image is selected by touching the touchscreen over it. A display such as that shown in FIG. 40 is shown while the audio for the selected picture is played using a progress bar, displaying the image number being played, and providing a STOP playback override option. After play is finished or if STOP playback is pressed, the display reverts to the original options, as shown in FIG. 41. If the controller accesses the audio data storage means for the print and finds no audio recorded yet for the selected image, it informs the operator of this, as shown in FIG. 42, with the operator given options to RECORD or COPY.

Figure 21:
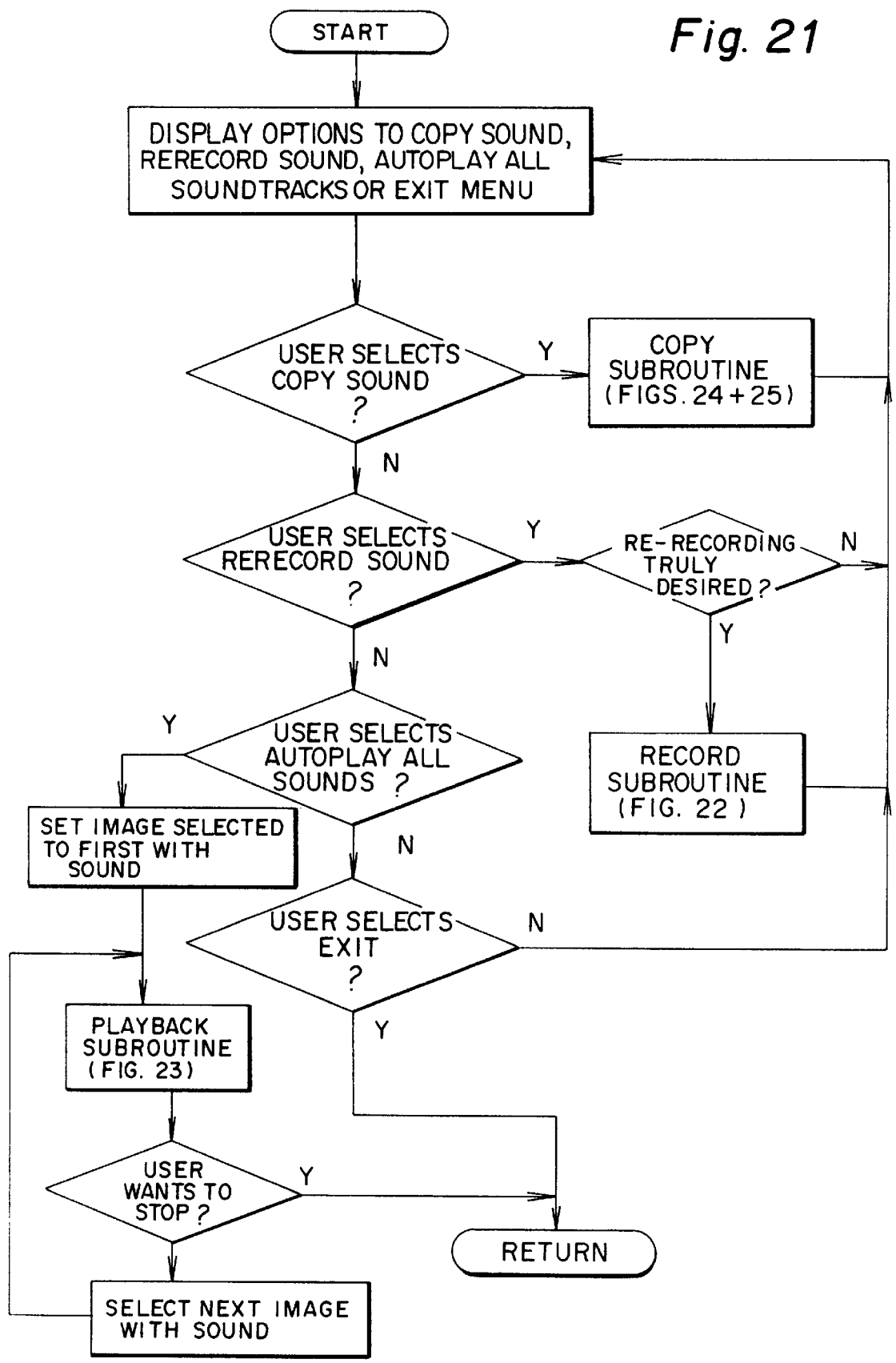
Figure 45:

If the user has pressed MENU at either the FIG. 39 or FIG. 41 stage, he receives a menu shown in FIG. 45 to COPY, RERECORD or AUTOPLAY. As illustrated in FIG. 21, if the user selects either COPY or RECORD, the appropriate subroutines for those options are executed. If the user selects AUTOPLAY, then the player sequentially plays the audio associated with every image beginning with image number one.

Figure 22:
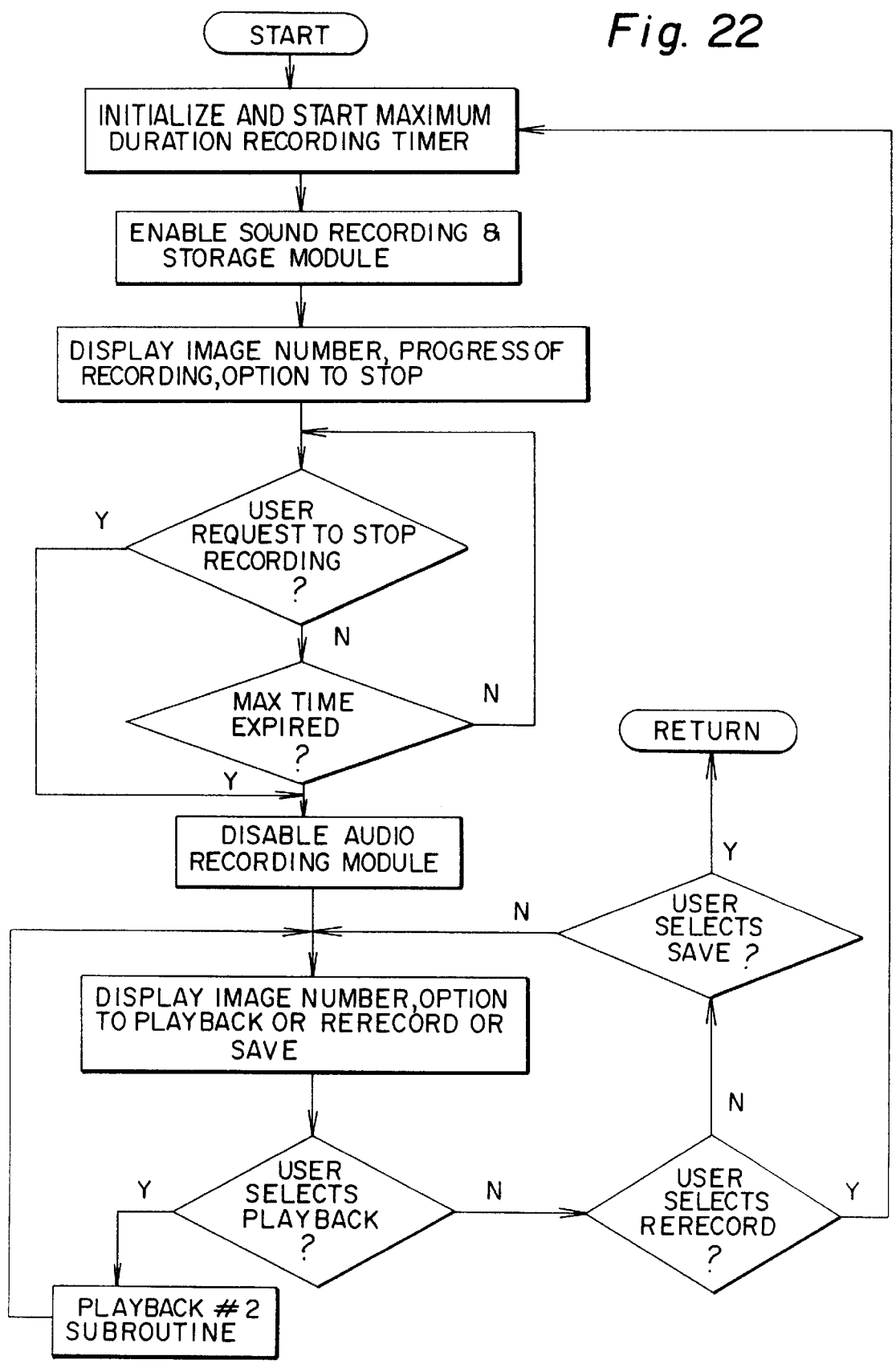
Figure 42:
Figure 43:
Figure 44:

If the user has requested either RECORD or RERECORD in displays shown in FIGS. 42, 44 or 45, a routine illustrated in FIG. 22 is begun to record audio for that image in the portion of the audio data storage means set aside for audio data for the image previously selected. The routine shown in FIG. 22 first sets the maximum duration recording timer and then enables the audio recording while displaying the recording time remaining, as shown in FIG. 43, using an appropriate progress bar and a STOP recording soft button. If either STOP is touched or the maximum duration time expires, then the audio recording module is halted, and the options shown in FIG. 44 are again displayed.

Figure 24:
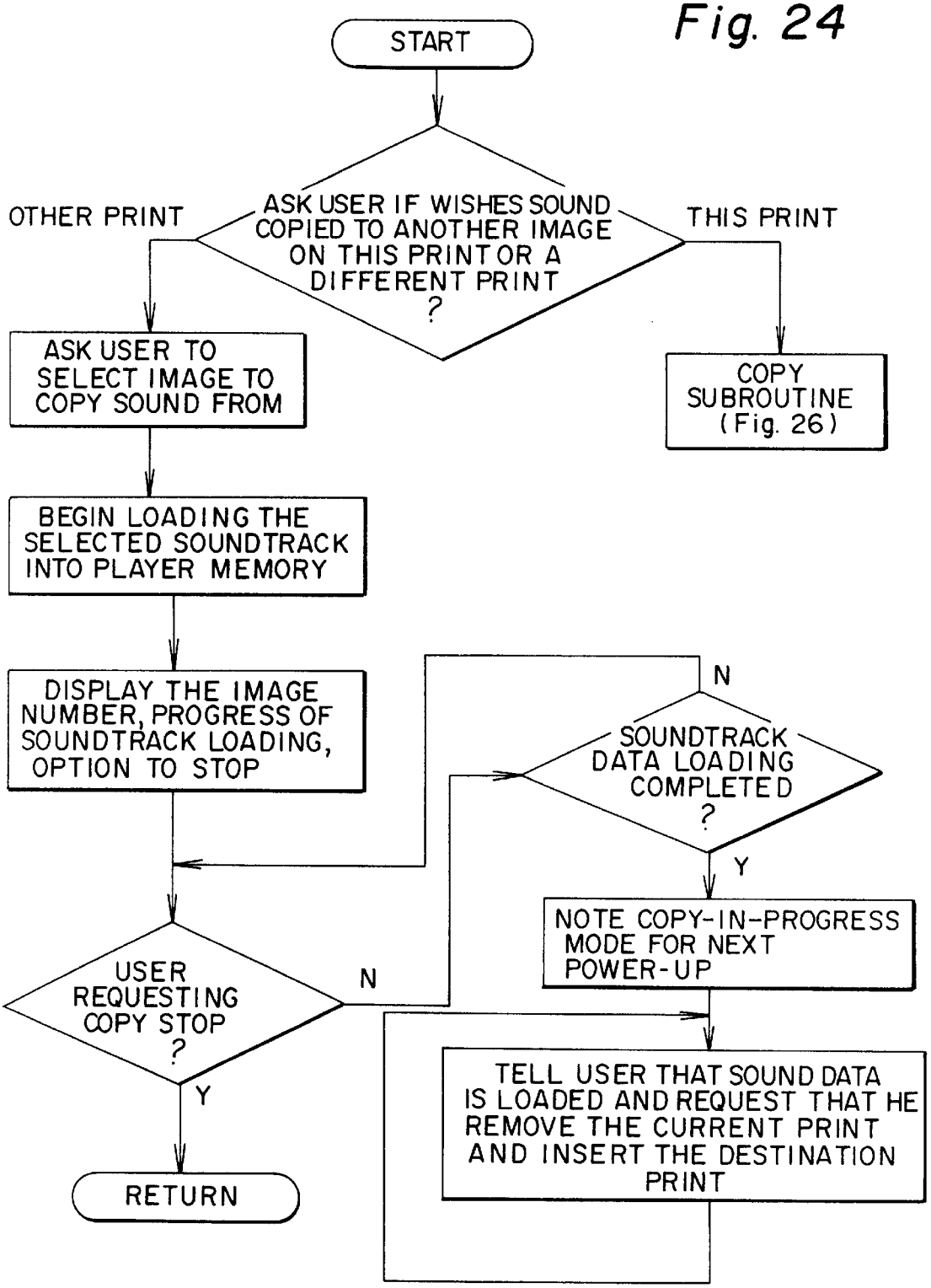
Figure 25:
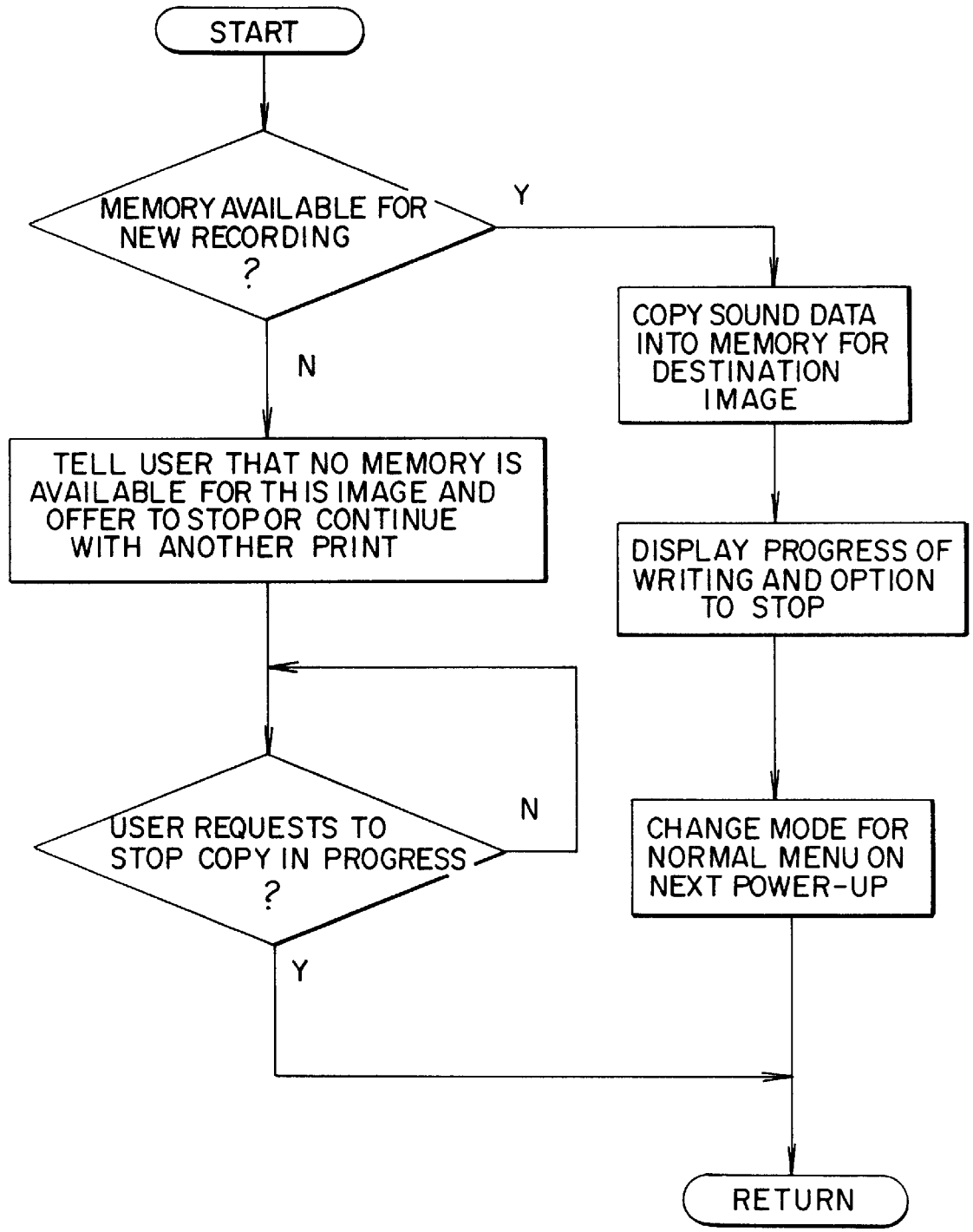
Figure 26:
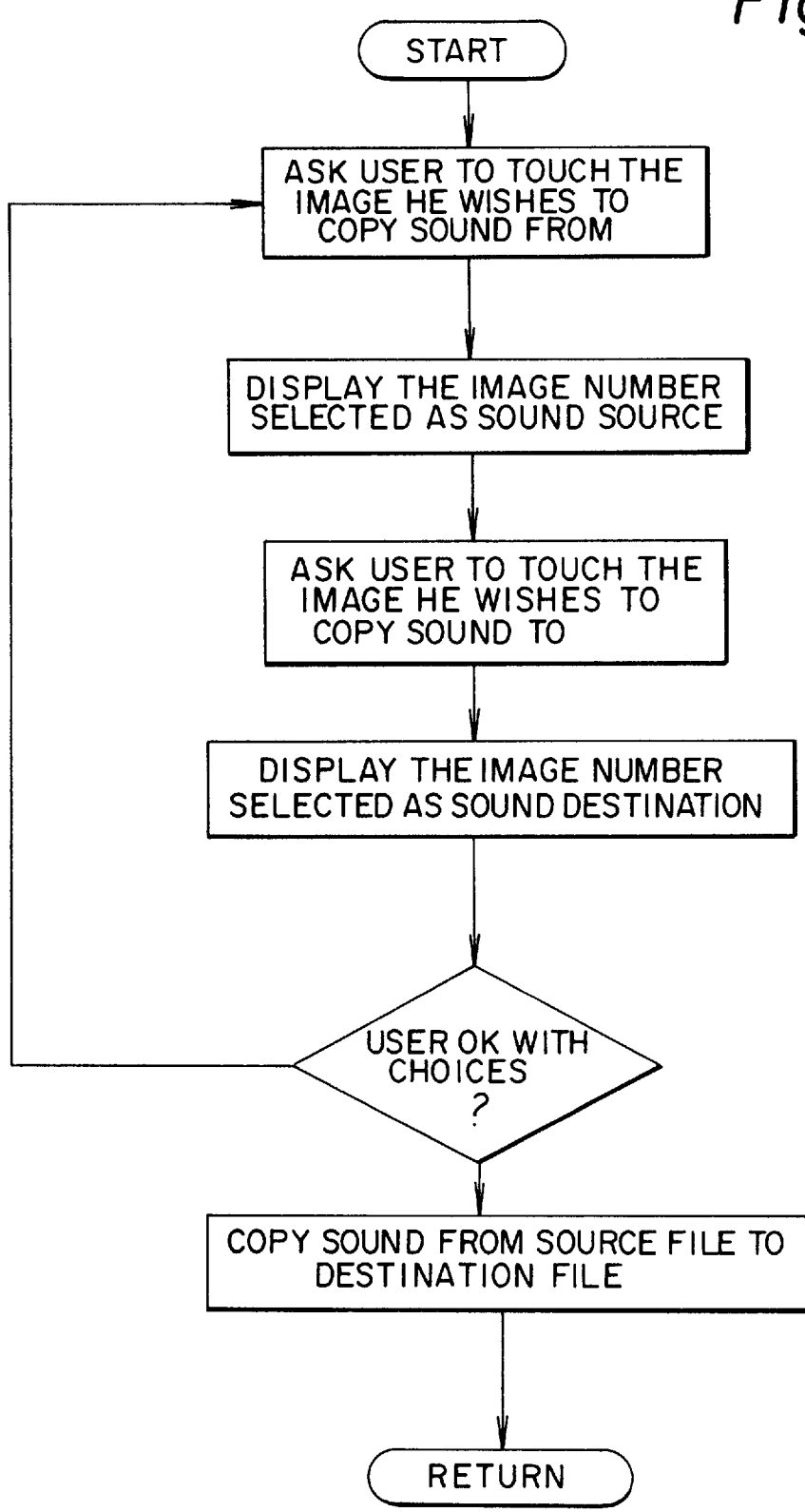

FIGS. 24–26 illustrate a copy routine for index prints which is initiated by pressing COPY in either FIG. 42 or FIG. 45 displays. The user is first asked via the display shown in FIG. 46 if the audio is to be copied to this index print or another print. As shown in FIG. 24, if the user picks another print, then the user is asked via the display shown in FIG. 47 to touch the image to be copied. In response to touching the image, the controller copies the audio data associated with the image touched from the audio data storage means of the print into the player memory buffer 54 with an appropriate display shown in FIG. 48, including a progress bar and a STOP soft button. If the user requests STOP, the loading is terminated and the display returns to the FIG. 46 menu. If the user does not override, then the audio data loading is completed, a flag is set in the EEPROM 52 indicating another print copy is underway, and the next instructions are indicated by the display in FIG. 49, telling the user to insert the next print, the destination print. Referring to FIG. 25, when the next print is inserted, if it is a single print, the controller first determines if storage space is available for the new recording. If storage space is available, then the audio that had been loaded into the player memory buffer 54 from the originating image is copied into the audio storage space for the destination print while showing the display in FIG. 50 with an appropriate progress bar. If there is no free space available, that is indicated to the operator with an appropriate message (FIG. 51), and the operator is given the option to record over the existing audio. At the conclusion of the copy routine, the controller resets the flag in EEPROM 52 to indicate no copy in progress.

Figure 46:
Figure 47:
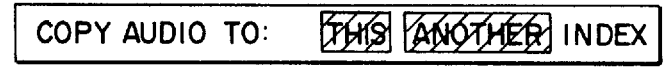

If the interrogation by the user at the beginning of FIG. 24, using the display shown in FIG. 46, is that the user desires the audio to be copied to another image on THIS index print, the program shown in FIG. 26 is used. The user is first asked to touch the image he wishes to copy audio from, as shown in FIG. 52. That choice is then displayed as in FIG. 53. As shown in FIG. 54, the user is then asked to touch the image to which he wishes to copy the audio. His choice is displayed in FIG. 55. His full set of choices is redisplayed, as shown in FIG. 56, to make sure that the operator is comfortable with his choices. If he is, then he presses RECORD, and the audio data segment or signal is copied directly from the source audio data location to the destination audio data location on the same audio data storage means while displaying the progress, as shown in FIG. 57.

As illustrated in the displays, in playing and rerecording using an index print, the audio data storage means 7 can and does contain more information than just the audio signal. For example, it includes the frame number to provide the displays shown in FIGS. 40, 48, 50, 53, 55 and 56. It could include other information recorded at the time of picture taking or photofinishing that could be displayed to the user, including picture taking conditions, date or relationship of an image to a group of images, etc.

Using minor variations on the programs just illustrated, audio can be copied not only from one index image to another index image on the same or different print but from one index print image to a single print image, or from a single image print to an index print.

When an audio data segment has been read into the player memory buffer 54, that segment can be saved in the buffer for any period of time (or turn off of the player) before writing into a new print. This capability can be utilized with appropriate displays at the points the FIGS. 36 and 49 displays are used.

FIG. 58 illustrates the general scheme for loading audio data into an accessible audio data storage means, for example, into an EEPROM, as described. Referring to FIG. 58, the audio associated with each of the images in a customer photofinishing order is held in readiness by suitable equipment, such as a computer 60 with a central processing unit 62, a PROM programmer 63, and a computer memory 64. The audio portion can originate from the film itself in the form of magnetic or optically encoded information, from media from an electronic camera, or from a separate storage media, as illustrated in the prior art mentioned above. Whatever the source, the audio information is preferably buffered into a single memory 64 from which the central processing unit 62 accesses the audio data and, using PROM programmer 63, programs audio data into either a single picture capacity EEPROM 7a or an index print capacity EEPROM 7b. The EEPROM shown and identified earlier is capable of receiving the audio data for a 40-image index print in a form in which each individual audio segment for each image is separately accessible.

Figure 59:
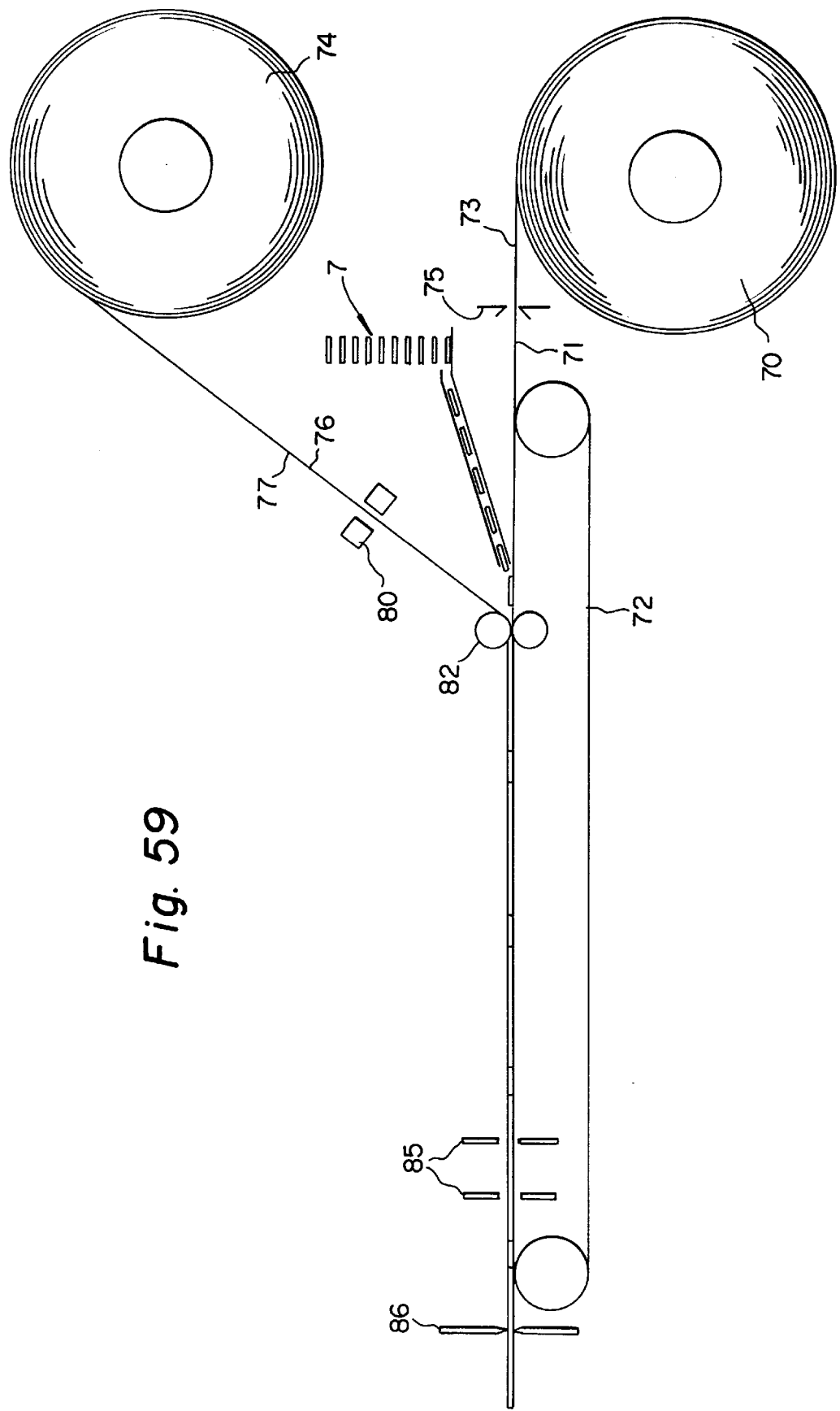
FIGS. 59 and 60 are side schematics illustrating alternative methods of assembling image-audio prints.

FIGS. 59, 60, 73 and 74 illustrate alternative methods of assembling the image audio prints in a continuous process. Referring to FIG. 59, a roll of uncut prints on a first substrate 70, preferably conventional photographic print paper, and having a first side 71 containing images and a second side 73 is unwound onto a conveyor 72. A roll of a backing substrate 74, which can be paper or plastic, and including a first side 76 containing an adhesive and a second side 77 is also unrolled onto conveyor 72 on top of first substrate 70. Pressure is applied by a pair of rollers 82 to adhesively affix the second substrate to the first substrate. Prior to rollers 82, EEPROMs 7 are fed onto the second side 73 of first substrate 70. Apertures are punched by a dye punch 80 in second substrate 74 to form a recess for EEPROMs 7, through which EEPROMs 7 are accessible after joining of the substrates. Pressure from the nip of rollers 82 not only affixes the substrates together, but also the EEPROM to second side 73.

A punch or mark detector 75 is positioned to detect a mark or punch in the first substrate 70 indicative of the edge of one or more images, which detection is used to control the positioning of the EPROMs and the dye punch 80 to appropriately position the EPROMs in the aperture made by the dye punch and in the correct position with respect to the image. The detectors also can provide information to assure that the appropriate EPROM is affixed to the appropriate image. After pressure from rollers 82 affixes the substrates and the EPROM, further mark or punch detectors 85 control a knife blade 86 which cuts image-audio prints from the now laminated substrates into individual prints.

Figure 60:
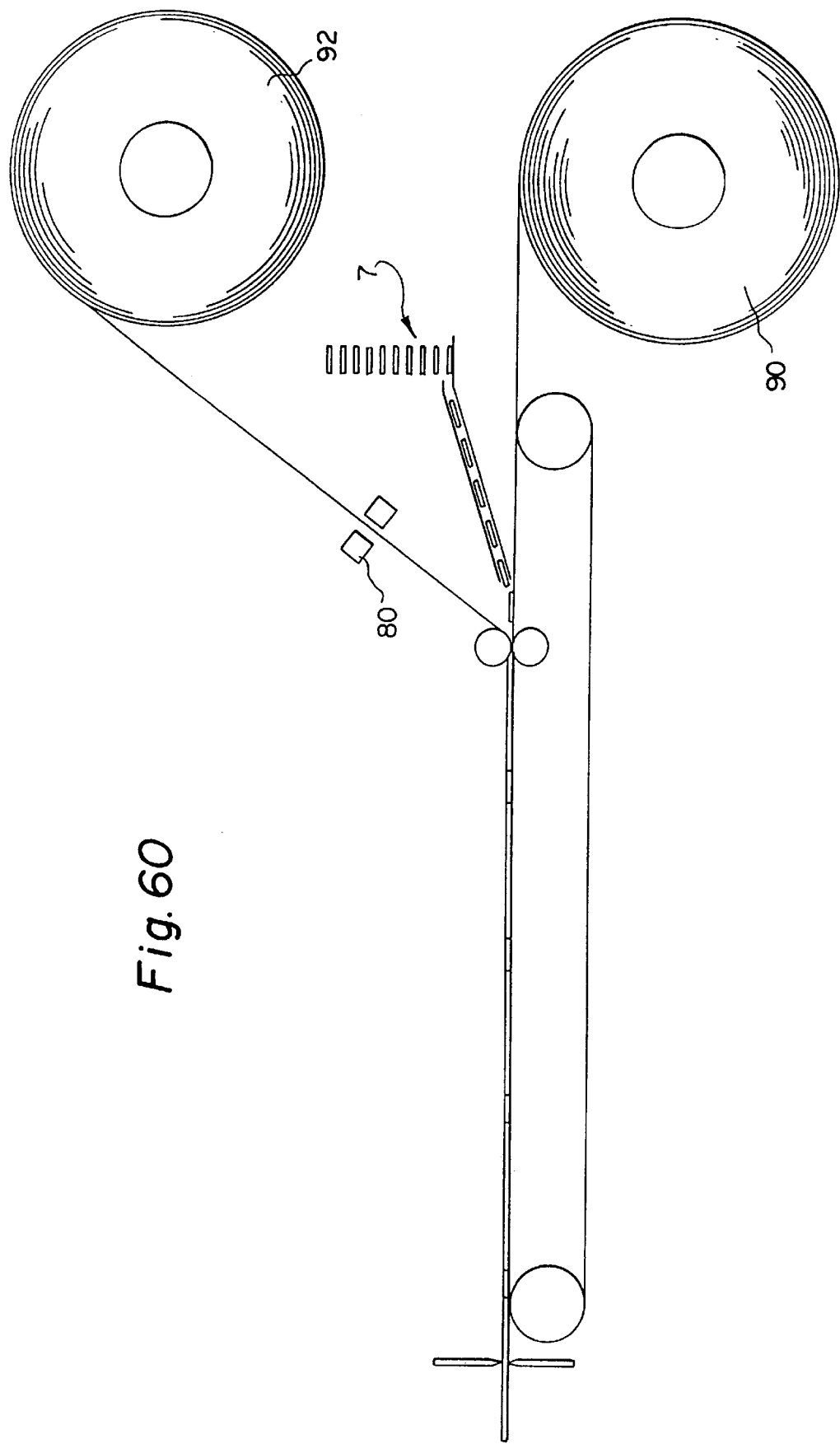

A similar process is shown in FIG. 60 in which a roll of plain backing substrate 90 and a roll of adhesive with a releasable backing 92 are used to apply an EPROM in much the same way as in FIG. 59 to plain substrate 90, as covered by substrate 99, which is again accessible through an opening cut with punch 80 in the substrate 90. The output of the process of FIG. 60 is a backing sheet having the EPROM already positioned in a recess which can then be positioned to the back of an already cut print. This process is somewhat more complicated because it requires the handling of cut sheets when the backing with the EPROM is attached to the print. However, it is a useful process because it can be adapted to print making equipment already in existence, which provides the cut prints without the backing in the ordinary course of its operation.

For most efficient production, the original audio data storage on the EPROMs is done before assembly. However, with some equipment, especially in adapting to present equipment already being used, it may well be expedient to assemble the print with a blank EPROM and add the audio to the assembled print.

Figure 68:
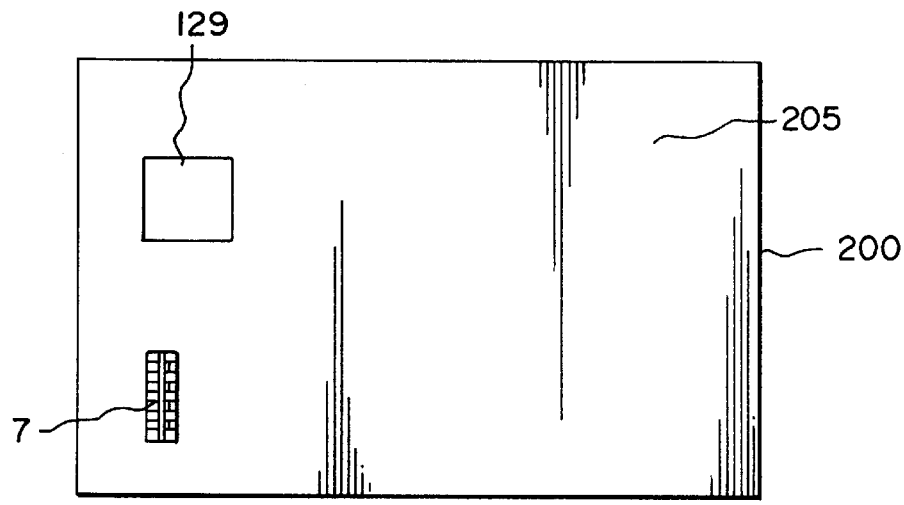
FIG. 68 is a bottom view of a print support for an alternative image-audio print.
Figure 69:
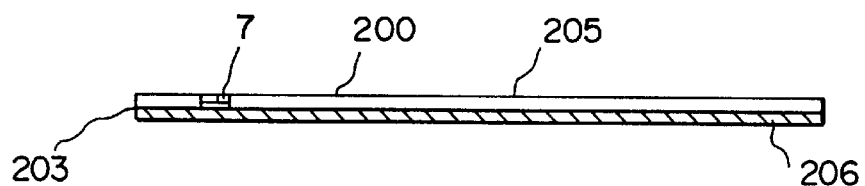
FIGS. 69–71 are side sections illustrating hand assembly of a print using the support shown in FIG. 64.
Figure 70:
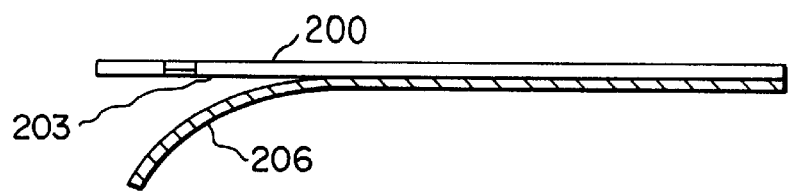
Figure 71:
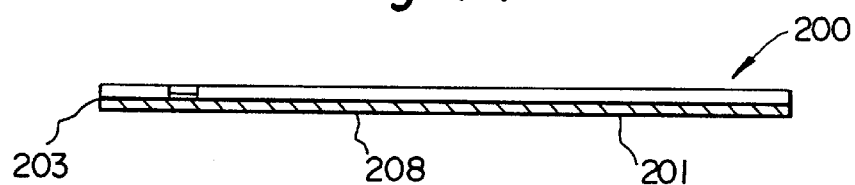
Figure 72:
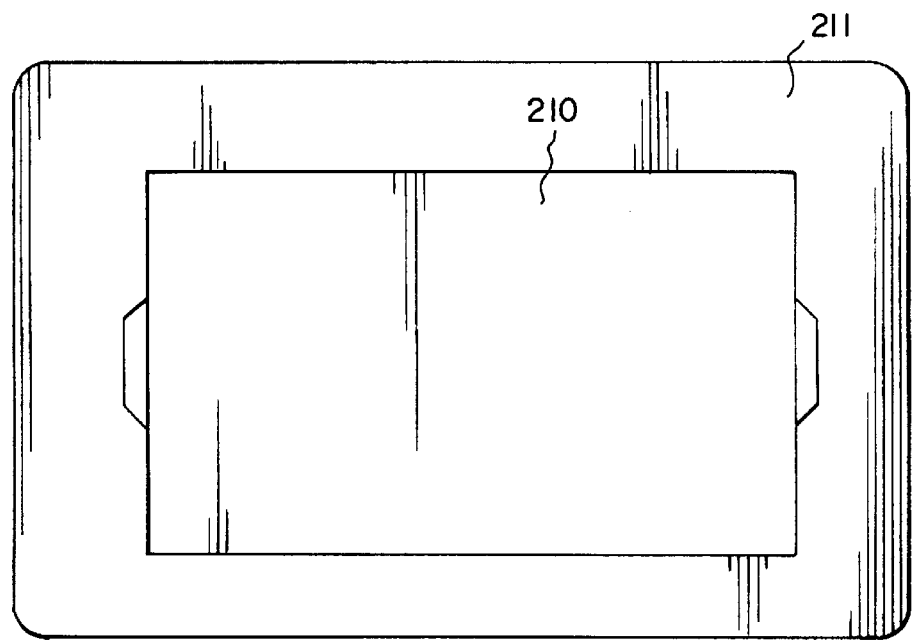
FIG. 72 is a bottom view of a player apparatus with a recess for assembling image-audio prints.

FIG. 68 shows a support 200 for an alternative image-audio print 201 (FIG. 71) whose hand assembly is shown in FIGS. 69–71 and automatic assembly is shown in FIG. 72. According to FIG. 68, an accessible audio data storage means 7, as described in the other embodiments, is manufactured as an integral part of support 200, which is preferably plastic. Only the contacts need be visible or accessible from outside support 200.

As shown in FIGS. 69–71, the support 200 with audio data storage means 7 accessible from a second side 205 of support 200 is sold to customers with an adhesive 203 on its first side and a backing paper 206 protecting the adhesive. As shown in FIG. 70, the backing paper 206 is removed, exposing the adhesive 203. The customer adheres a support, such as a photographic print 208 to the first side using the adhesive and forming the image-audio print 201, shown in FIG. 71. The image-audio print 201 then can be inserted in a player apparatus as described, and using the recording or copying capability, create a fully programmed image-audio print. This not only permits turning regular photographic prints into image-audio prints with new audio, it provides a convenient approach to providing duplicates of already programmed image-audio prints, including single duplicates from an image of an image-audio index print. The support 200 can have a recess 129 to facilitate location in a player in a manner similar to the print in FIGS. 61–63.

In the assembly shown in FIGS. 69–71, it is important that the contacts of the audio data storage means be correctly positioned relative to one or more edges of the print. Thus, the components should not have any overhanging edge. FIG. 72 shows a player 211 which has a recess 210 in its back to assist users in manually assembling an image-audio print. The recess is sized to receive a common length and width of print with minimal spacing. The support 200 and print 208 are each made of that common, predetermined length and width and can be aligned in the recess 210 and then pressed together. The recess assures not only accurate positioning of the contacts, but also a neat appearing assembled image-audio print.

Figure 73:
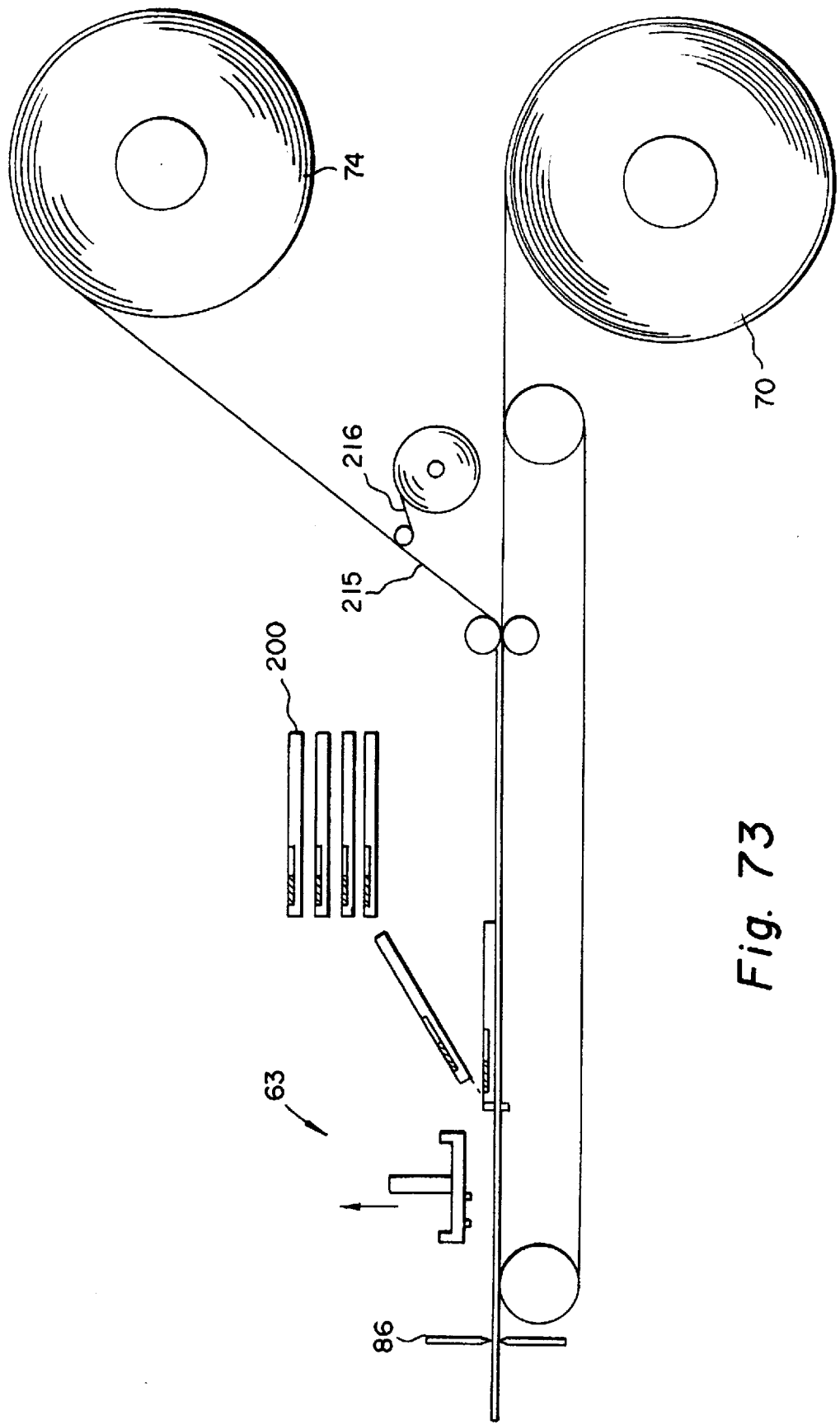

FIG. 73 illustrates automation of the FIGS. 69–71 process. A roll of uncut prints on a first substrate 70 can be the same and advanced the same as in FIGS. 59 and 60. An adhesive is applied to the second side of the first substrate 70, for example, with an adhesive web 215 on a backing paper 216. A stack of unprogrammed supports 200 of the length and width of the ultimate print are fed, one at a time, into position on the moving substrate 70, with each support aligned with an uncut print. A solenoid actuated PROM programmer 230 performs the dual purpose of programming the EEPROM in each support 200 and applying enough pressure to adhere the support 200 to the substrate 70 before cutting by knife 86 to the predetermined print size. PROM programmer 230 is connected to the main computer memory 64 (FIG. 58) and is timed with the movement of substrate 70 to place the right program in each image-audio print. Alternatively, the programming can be done before stacking the supports 200. This approach uses a unit (support 200) which can be manufactured as part of the EEPROM manufacturing process with a reliability in the final print difficult to maintain through the other manufacturing methods.

Figure 74:
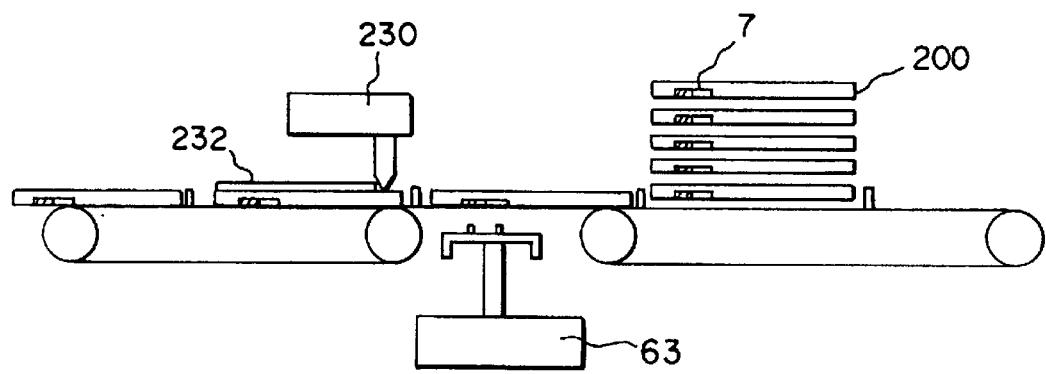
FIGS. 73 and 74 are a side schematics illustrating a photofinisher's method of assembling the prints illustrated in FIGS. 64–67.

FIG. 74 illustrates an assembly embodiment for an image-audio print having integral construction. It consists of a stack of unprogrammed backs 200 containing an audio storage means 7 with backside electrical contacts 15. In this embodiment, the backside sheet material is adapted to receive an image from an inkjet printer, a thermal dye transfer printer or other hard copy image means. Thus, in this embodiment, no frontside sheet bearing a visual image is required. A stack of unprogrammed supports 200, of the length and width of the ultimate print are fed, one at a time, into position in the PROM programmer 63. A solenoid actuated head programs the audio data into the audio data storage means 7. The programmed back is then conveyed to an image transfer station 230 where the frontside receives a pictorial image 232. This may be done by inkjet printing, thermal dye transfer, electrophotographic or other hard copy image means. The completed image-audio prints are then grouped into customer orders for delivery.

The invention has been described in detail with particular reference to a preferred embodiment thereof, but it will be understood that variations and modifications can be effected within the spirit and scope of the invention as described hereinabove and as defined in the appended claims.

We claim:

1. An image-audio print having a frontside, a backside and audio data storage means, the frontside having visible image information and the backside having a recess in which said storage means is positioned or having said storage means integral with said backside, said audio data storage means having accessible audio data transfer terminals; wherein the visible image information includes a plurality of images and where the audio data storage means includes means for storing and separately accessing a discrete audio data segment or signal corresponding to each image.

2. A print according to claim 1 wherein the audio data storage means includes a plurality of contacts allowing selective access of each discrete audio data segment or signal.

3. A print according to claim 1 wherein the audio data storage means is contained in a recess in the second sheet which recess is defined by an aperture through the second sheet, and the audio data storage means is affixed to the first sheet and accessible through the aperture.

4. A print audio playback system comprising an image audio print having a frontside, a backside and audio data storage means, the frontside having visible image information and the backside having a recess in which said storage means is positioned or having said storage means integral with said backside, said audio data storage means having accessible audio data transfer terminals, the image audio print further having opposite edges with opposing locating notches at predetermined positions on the opposite edges; and an audio player having a slot for receiving the print and opposing resilient means for holding the print in a predetermined location, the notches in the edges being positioned to cooperate with the opposing resilient means to locate the print in the slot.

5. A print audio playback system comprising an image audio print having a frontside, a backside and audio data storage means, the frontside having visible image information and the backside having a recess in which said storage means is positioned or having said storage means integral with said backside, said audio data storage means having accessible audio data transfer terminals; and an audio player for receiving the print in a predetermined location, said print further including locating means cooperable with the player for locating the print with respect to the player.

6. A system according to claim 5 wherein the audio data storage means is located in a predetermined position in the print with respect to the print locating means.

7. A system according to claim 5 wherein the visible image information on the frontside of the print contains a plurality of images and wherein the plurality of images are positioned on the frontside of the print in a predetermined location with respect to the print locating means.

8. A print audio playback system comprising an image audio print and an audio player, wherein the print has a frontside, a backside and audio data storage means, the frontside having visible image information including a plurality of images, the backside having a recess in which said storage means is positioned or having said storage means integral with said backside, said audio data storage means having accessible audio data transfer terminals and means for storing and separately accessing a discrete audio data segment or signal corresponding to each image; the player having print locating means and a touchscreen positioned to overlie said print received therein and wherein the plurality of images on the print are located in a predetermined location with respect to the print locating means of the player.

9. A method of making an image-audio print of a predetermined length and width, comprising:
   providing a first substrate having said predetermined length and width and having image information on a first side and having a second side,
   providing a second substrate having said predetermined length and width, a first side and a second side and an audio data storage means integral to the second substrate and accessible from the second side of the second substrate, the first side of the second substrate containing an adhesive,
   affixing the second side of the first substrate to the first side of the second substrate with the substrates totally overlying each other without edge overlap, and
   exposing an adhesive backing sheet from the first side of the second substrate before the affixing step.

10. A method of making an image-audio print of a predetermined length and width, comprising:
   affixing a first side of a second substrate having first and second sides and said predetermined length and width and an audio data storage means integral to the second substrate and accessible to its second side to a second side of a first substrate which first substrate is in web configuration and has a first side with a series of visible images, and cutting said first substrate to form said image-audio print.

11. A method of making a print having both image and audio information, said method comprising:
   providing a first web having first and second sides with a series of visible images on the first side,
   providing a second web,
   forming a series of apertures in the second web,
   positioning an accessible audio data storage means on the second side of the first web, each storage means corresponding to a separate image on the first side of the first web,
   overlying the second side of the first web with the second web with an aperture of the second web aligned with an audio data storage means affixed to the first web,
   affixing the webs together, and
   cutting the affixed webs into prints having image and audio information on opposite sides.

12. A method of making a print having both image and audio information, comprising:
   providing a first web having first and second sides with a series of images on the first side,
   providing second and third webs, said second web having first and second sides,
   forming a series of apertures in the third web, each aperture corresponding to an image on the first web,
   affixing a series of accessible audio data storage means on the second side of the second web, one storage means corresponding to each image on the first web,
   affixing the third web to the second side of the second web with each accessible audio data storage means on the second web aligned with an aperture in the third web,
   affixing the first side of the second web to the second side of the first web, and
   cutting the affixed webs into prints having image information and audio information on opposite sides.

13. Player apparatus for receiving a print having both image and audio information, which print has first and second opposite edges, print locating means including discontinuities in the first and second edges, a frontside having visible image information and a backside having an accessible audio data storage means, with the accessible audio data storage means positioned in a predetermined location with respect to the print locating means, said apparatus comprising:
   means including a slot having an open side for receiving the print in a receiving position with the frontside viewable from a viewing side of the apparatus and including resilient means responsive to the discontinuities of the print locating means for accurately positioning the accessible audio data storage means with respect to the receiving means;
   means positioned opposite a received print from the viewing side of the apparatus for accessing an accurately positioned accessible audio data storage means; and
   a transparent touchscreen positioned on the viewing side of a print received in the slot.

14. Player apparatus for receiving a print having both image and audio information, which print has first and second opposite edges, print locating means including discontinuities in the first and second edges, a frontside having visible image information and a backside having an accessible audio data storage means, with the accessible audio data storage means positioned in a predetermined location with respect to the print locating means, said apparatus comprising:

means for receiving the print in a receiving position with the frontside viewable from a viewing side of the apparatus and including resilient means responsive to the discontinuities of the print locating means for accurately positioning the accessible audio data storage means with respect to the receiving means; and means positioned opposite a received print from the viewing side of the apparatus for accessing an accurately positioned accessible audio data storage means wherein said print includes a third edge connecting the first and second edges and wherein the player apparatus receiving means further includes a power-on switch engageable by the third edge when the discontinuities are engaged by the resilient means.

15. Player apparatus for receiving an accessible audio data storage means having a plurality of audio data segments or signals and a print which print has a plurality of images on a frontside, the images corresponding to the audio data segments or signals, said apparatus comprising:

means for receiving the print and for positioning the print in a predetermined location with the frontside viewable, means for selecting one of the plurality of images, such selecting means comprising a touchscreen positioned to overlie the frontside of a received print and means for receiving and accessing the accessible audio data storage means including means for playing an audio data segment or signal from the audio data storage means in response to a selection made with respect to one of the plurality of images.

16. Player apparatus according to claim 15 including a display means positioned to underlie the touchscreen and cooperable with the touchscreen to effect operator control of the player apparatus.

17. Player apparatus for receiving a print having image and audio information, which print has a frontside having a plurality of images at predetermined locations relative to the print locating means, an accessible audio data storage means, and a backside providing access to the accessible audio data storage means, said accessible audio data storage means having a plurality of audio segments, each segment corresponding to a different one of said images, said player apparatus comprising:

means for receiving the print in a predetermined location with the frontside viewable from a viewing side of the player apparatus, means for selecting one of said plurality of images, and means positioned facing the backside of a received print in the predetermined location for accessing the accessible audio data storage means and including means for playing a selected audio data segment from the audio data storage means in response to said image selection.

18. Player apparatus according to claim 17 wherein the means for selecting includes a touchscreen positioned to overlie a received print.

19. Player apparatus according to claim 17 including means for recording discreet audio data segments in the accessible audio data storage means of a received print for each of the plurality of images.

20. Player apparatus according to claim 17 including means actuable by touchscreen actuation over an image for selecting which audio data segment is to be recorded.

21. Player apparatus according to claim 17 further including player apparatus memory means for storing an audio data segment and means for accessing the accessible audio data storage means of a received print to store a discreet data segment from said audio data storage means in a received print in the player apparatus memory.

22. Player apparatus according to claim 21 including means for accessing the player apparatus memory to utilize a stored audio data segment originating from a first print to record said audio data segment in an audio data storage means of a second print.

23. Player apparatus according to claim 18 further including an electronic display means positioned to underlie the touchscreen and means for controlling the player apparatus by cooperation between the touchscreen and the display means.

24. Player apparatus for receiving an accessible audio data storage means and an index print, which index print includes a plurality of images and which accessible audio data storage means includes a plurality of audio data segments, each data segment corresponding to a different one of the plurality of images, said apparatus comprising:

means for receiving the index print, means for receiving the accessible audio data storage means, means for selecting one of the plurality of images, means for accessing the data segment in the accessible audio data storage means corresponding to the selected images;

a player apparatus memory and means for storing the selected audio data segment in said memory for use in recording into a different audio data storage means.

25. Player apparatus according to claim 24 further including means for playing the selected data segment.

26. Player apparatus according to claim 24 further including means for recording over the selected data segment.

27. Player apparatus according to claim 24 for use with an accessible audio data storage means and an index print in which the accessible audio data storage means is accessible from the backside of the index print and wherein the player apparatus includes means for receiving the index print in a location in which the means for accessing the accessible audio data storage means faces the backside of the received print and is positioned to access the accessible audio data storage means.

28. Player apparatus according to claim 24 wherein the means for selecting is a touchscreen positioned to overlie a received print.

29. Player apparatus according to claim 28 further including an electronic display means positioned to underlie the touchscreen and means for controlling the player apparatus by cooperation between the touchscreen and the display means.

30. Player apparatus according to claim 24 further including means for recognizing which image has been selected and for indicating an identity of the selected image.

31. Player apparatus according to claim 30 wherein said means for indicating an identity of the selected image is an LCD display means.

32. Player apparatus according to claim 30 wherein said display shows one or both of a message and a picture frame number.

33. Player apparatus for receiving a print having both image information and accessible audio data storage means, said player apparatus comprising:

means for receiving said print, player means for storing an audio data segment, means for accessing the accessible audio data storage means of a received print and for storing a data segment from the accessible audio data storage means in the player means for storing an audio data segment, and means for recording a data segment stored in the player means for storing an audio data segment in an accessible audio data storage means of a received print to thereby copy an audio data segment from one accessible audio data storage means into either a different place in the same accessible audio data storage means or in an accessible audio data storage means associated with a different print.

34. Player apparatus according to claim 33 including means for signaling that an audio segment is stored in the player means for storing.

35. Player apparatus according to claim 34 wherein said means for signaling that an audio segment is stored in the player means for storing is a nonvolatile electronically interrogable and configurable memory device.

36. A player apparatus for receiving a print having a frontside and a backside, the frontside having visible image information and the backside including accessible audio data storage means having an audio data segment or signal associated with the image information, said player apparatus comprising:

means for receiving a print with the audio data storage means in a predetermined location, means for storing an audio data segment, means for accessing an audio data segment in an accessible audio data storage means of a received print and for storing that data segment in the means for storing, and means for retrieving an audio data segment stored in the means for storing and for further storing that data segment in an accessible audio data storage means of a second print received by the player apparatus different from the print in which the data segment originated, thereby copying one audio data segment from one print to another.

37. Player apparatus for receiving an accessible audio data storage means and an index print, which index print includes a plurality of images and which accessible audio data storage means includes a plurality of audio data segments, each data segment corresponding to a different one of the plurality of images, said apparatus comprising:

means for receiving the index print, means for receiving the accessible audio data storage means, means for selecting one of the plurality of images, means for accessing the data segment in the accessible audio data storage means corresponding to the selected image;

a player apparatus memory and means for storing the selected audio data segment in said memory for use in recording into a different audio data storage means; and means for recognizing whether a received print is an index print or a single image print.

38. Player apparatus according to claim 37 wherein said means for recognizing a received print is interrogation of an electronic memory device.

* * * * *

UNITED STATES PATENT AND TRADEMARK OFFICE
CERTIFICATE OF CORRECTION

PATENT NO. : 5,878,292
DATED : March 2, 1999
INVENTOR(S): Cynthia S. Bell, et al It is certified that error appears in the above-identified patent and that said Letters Patent is hereby corrected as shown below:

On the title page, item [60] should read:
--[60] Provisional Application No. 60/025,163, Aug. 29, 1996.--.

On the title page, under "Attorney, Agent, or Firm, change "Boss" to --Boos--.

Column 1, line 3, insert the following:
--CROSS REFERENCE TO RELATED APPLICATION
Reference is made to and priority claimed from U.S. provisional application Ser. No. 60/025,163, filed Aug. 29, 1996, entitled IMAGE-AUDIO PRINT, METHOD OF MAKING AND PLAYER FOR USING.--.

Signed and Sealed this

Seventh Day of September, 1999

Attest:

Q. TODD DICKINSON

Attesting Officer

Acting Commissioner of Patents and Trademarks